(12) United States Patent
Shirai

(10) Patent No.: US 10,800,479 B2
(45) Date of Patent: Oct. 13, 2020

(54) FLUID FLOW CONTROL STRUCTURE FOR BICYCLE DEVICE AND BICYCLE SEATPOST ASSEMBLY

(71) Applicant: Shimano Inc., Sakai-shi, Osaka (JP)

(72) Inventor: Toyoto Shirai, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 124 days.

(21) Appl. No.: 16/118,149

(22) Filed: Aug. 30, 2018

(65) Prior Publication Data

US 2019/0071146 A1 Mar. 7, 2019

(30) Foreign Application Priority Data

Sep. 6, 2017 (DE) .................. 10 2017 120 527

(51) Int. Cl.
*B62K 19/36* (2006.01)
*F16F 9/34* (2006.01)
*B62K 23/06* (2006.01)
*F16F 9/46* (2006.01)
*B62J 1/08* (2006.01)

(52) U.S. Cl.
CPC .............. *B62K 19/36* (2013.01); *B62K 23/06* (2013.01); *F16F 9/34* (2013.01); *F16F 9/461* (2013.01); *B62J 2001/085* (2013.01)

(58) Field of Classification Search
CPC ...... B62J 1/06; B62J 1/08; B62J 1/085; B62K 9/36; B62K 23/06; B62K 19/36; F16F 9/34; F16F 9/461; F15B 15/16

USPC .......................................... 188/280; 280/287
See application file for complete search history.

(56) References Cited

U.S. PATENT DOCUMENTS

| 2012/0104727 A1* | 5/2012 | Hsu ............................ B62J 1/08 280/287 |
| 2016/0121952 A1* | 5/2016 | Shirai ......................... B62J 1/08 248/161 |
| 2016/0355225 A1* | 12/2016 | Shirai ......................... B62J 1/08 |

* cited by examiner

*Primary Examiner* — Robert A. Siconolfi
*Assistant Examiner* — San M Aung
(74) *Attorney, Agent, or Firm* — Alleman Hall Creasman & Tuttle LLP

(57) ABSTRACT

A fluid flow control structure for a bicycle device comprises a fluid chamber structure and a piston. The fluid chamber structure includes a tube member at least partly defining a first chamber, a third chamber, and a fluid passage for changing volumes of the first chamber and the third chamber. The tube member has a longitudinal axis. The fluid passage includes a minimum fluid passage. The piston is movably disposed in the tube member in a telescopic direction of the longitudinal axis. An aperture rate is defined by dividing an area of the minimum fluid passage by a flow rate. The flow rate is defined by fluid volume passing through the minimum fluid passage as the tube member moves relative to the piston at 1.0 mm. The aperture rate is equal to or greater than 0.1.

20 Claims, 15 Drawing Sheets

FLUID FLOW CONTROL STRUCTURE FOR BICYCLE DEVICE AND BICYCLE SEATPOST ASSEMBLY

BACKGROUND

Technical Field

The technology disclosed herein relates to a fluid flow control structure for a bicycle device and a bicycle seatpost assembly with the fluid flow control structure.

Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

One bicycle component that has been extensively redesigned is a bicycle seatpost assembly. For example, a bicycle seatpost assembly includes a fluid flow control structure. A length of the seatpost assembly is adjusted by the fluid flow control structure.

SUMMARY OF THE INVENTION

In accordance with a first aspect of the present invention, a fluid flow control structure for a bicycle device comprises a fluid chamber structure and a piston.

The fluid chamber structure includes a tube member at least partly defining a first chamber, a second chamber, and a fluid passage for changing volumes of the first chamber and the second chamber. The tube member has a longitudinal axis. The fluid passage includes a minimum fluid passage. The piston is movably disposed in the tube member in an axial direction of the longitudinal axis.

An aperture rate is defined by dividing an area of the minimum fluid passage by a flow rate. The flow rate is defined by fluid volume passing through the minimum fluid passage as the tube member moves relative to the piston at 1.0 mm. The aperture rate is equal to or greater than 0.1.

With the fluid flow control structure according to the first aspect, the fluid flow control structure is capable of reducing resistance of the fluid flow to the fluid passage by the above configuration. Thereby, the fluid flow control structure is capable of smoothly moving the tube member with respect to the piston. In other words, the fluid flow control structure is capable of moving the tube member with respect to the piston by smaller force than the conventional fluid flow control structure.

For example, in case that the fluid flow control structure is applied to the seatpost assembly, the fluid flow control structure is capable of increasing elevating speed of a seat post without increasing pressure of an air spring. Also, the fluid flow control structure is capable of reducing pushing-down force of the seat post.

In accordance with a second aspect of the present invention, the fluid flow control structure according to the first aspect is configured so that the aperture rate is equal to or smaller than 0.6.

With the fluid flow control structure according to the second aspect, the fluid flow control structure is capable of smoothly moving the tube member with respect to the piston. In other words, the fluid flow control structure is capable of moving the tube member with respect to the piston by smaller force than the conventional fluid flow control structure.

In accordance with a third aspect of the present invention, the fluid flow control structure according to the second aspect is configured so that the aperture rate is equal to or smaller than 0.35.

With the fluid flow control structure according to the third aspect, the fluid flow control structure is capable of smoothly moving the tube member with respect to the piston. In other words, the fluid flow control structure is capable of moving the tube member with respect to the piston by smaller force than the conventional fluid flow control structure.

In accordance with a fourth aspect of the present invention, the fluid flow control structure according to the third aspect is configured so that the aperture rate is equal to or smaller than 0.15.

With the fluid flow control structure according to the fourth aspect, the fluid flow control structure is capable of smoothly moving the tube member with respect to the piston. In other words, the fluid flow control structure is capable of moving the tube member with respect to the piston by smaller force than the conventional fluid flow control structure.

In accordance with a fifth aspect of the present invention, the fluid flow control structure according to any one of the first to fourth aspects is configured so that kinematic viscosity of fluid in the fluid passage is equal to or smaller than 50 $mm^2$/sec at 40 degrees Celsius.

With the fluid flow control structure according to the fifth aspect, the fluid flow control structure is capable of increasing the Reynolds number and reducing resistance of the fluid flow to the fluid passage.

In accordance with a sixth aspect of the present invention, the fluid flow control structure according to the fifth aspect is configured so that the kinematic viscosity is equal to or smaller than 10 $mm^2$/sec at 40 degrees Celsius.

With the fluid flow control structure according to the sixth aspect, the fluid flow control structure is capable of further increasing the Reynolds number and reducing resistance of the fluid flow to the fluid passage.

In accordance with a seventh aspect of the present invention, the fluid flow control structure according to any one of the first to sixth aspects is configured so that the Reynolds number of fluid in the fluid passage is equal to or greater than 100.

With the fluid flow control structure according to the seventh aspect, the fluid flow control structure is capable of reducing resistance of the fluid flow to the fluid passage.

In accordance with an eighth aspect of the present invention, the fluid flow control structure according to the seventh aspect is configured so that the Reynolds number is equal to or greater than 150.

With the fluid flow control structure according to the eighth aspect, the fluid flow control structure is capable of further reducing resistance of the fluid flow to the fluid passage.

In accordance with a ninth aspect of the present invention, the fluid flow control structure according to any one of the first to eighth aspects is configured so that the flow rate is defined based on an outer diameter of the piston.

With the fluid flow control structure according to the ninth aspect, the fluid flow control structure is capable of smoothly moving the tube member with respect to the piston. In other words, the fluid flow control structure is capable of moving the tube member with respect to the piston by smaller force than the conventional fluid flow control structure.

In accordance with a tenth aspect of the present invention, the fluid flow control structure according to the ninth aspect is configured so that the outer diameter of the piston is equal to or greater than 8.0 mm.

With the fluid flow control structure according to the tenth aspect, the fluid flow control structure is capable of preferably enhancing strength of the piston by enlarging the outer diameter.

In accordance with an eleventh aspect of the present invention, the fluid flow control structure according to the tenth aspect is configured so that the outer diameter of the piston is equal to or smaller than 30 mm.

With the fluid flow control structure according to the eleventh aspect, the fluid flow control structure is capable of preferably enhancing strength of the piston by enlarging the outer diameter.

In accordance with a twelfth aspect of the present invention, the fluid flow control structure according to any one of the first to eleventh aspects is configured so that the area of the minimum fluid passage is equal to or greater than 13 $mm^2$.

With the fluid flow control structure according to the twelfth aspect, the fluid flow control structure is capable of enlarging the aperture rate.

In accordance with a thirteenth aspect of the present invention, the fluid flow control structure according to the twelfth aspect is configured so that the area of the minimum fluid passage is equal to or greater than 15 $mm^2$.

With the fluid flow control structure according to the thirteenth aspect, the fluid flow control structure is capable of further enlarging the aperture rate.

In accordance with a fourteenth aspect of the present invention, the fluid flow control structure according to any one of the first to thirteenth aspects is configured so that the fluid chamber structure includes a port. The port has a closed state in which the port fluidly separates the first chamber and the second chamber, and an open state in which the port fluidly connects the first chamber and the second chamber. The area of the minimum fluid passage is defined by the open state of the port.

With the fluid flow control structure according to the fourteenth aspect, the fluid flow control structure is capable of defining the aperture rate by the port and adjusting the aperture rate by changing an aperture with the port.

In accordance with a fifteenth aspect of the present invention, the fluid flow control structure according to the fourteenth aspect further comprises a sealing member. The sealing member is movable relative to the port between an open position to define the open state of the port, and a close position to define the closed state of the port.

With the fluid flow control structure according to the fifteenth aspect, the fluid flow control structure is capable of defining the aperture rate by the port and adjusting the aperture rate by changing an aperture with the port.

In accordance with a sixteenth aspect of the present invention, the fluid flow control structure according to the fifteenth aspect is configured so that the port is formed on the piston. The sealing member is movable relative to the piston in the axial direction. The open position of the sealing member is defined in a state where the sealing member is farthest from the port in the axial direction.

With the fluid flow control structure according to the sixteenth aspect, the fluid flow control structure is capable of adjusting the aperture rate by changing an aperture with the port in the state where the sealing member is farthest from the port.

In accordance with a seventeenth aspect of the present invention, a bicycle seatpost assembly comprises the fluid flow control structure according to any one of the first to sixteenth aspects, a first tube, and a second tube. The first tube has an opening at one end.

The second tube is telescopically received in the first tube in the axial direction via the opening of the first tube. The second tube has a distal end to which a bicycle seat is to be mounted and a proximal end opposite to the distal end in the axial direction.

The second tube is movable in the axial direction between a first position in which the distal end is closest to the opening of the first tube and a second position in which the distal end is farthest to the opening of the first tube.

With the bicycle seatpost assembly according to the seventeenth aspect, the bicycle seatpost assembly is capable of reducing resistance of the fluid flow to the fluid passage in the fluid flow control structure.

Thereby, the bicycle seatpost assembly is capable of increasing elevating speed of a second tube with respect to the first tube. Also, the bicycle seatpost assembly is capable of reducing pushing-down force of the second tube with respect to the first tube.

In accordance with an eighteenth aspect of the present invention, the bicycle seatpost assembly according to the seventeenth aspect is configured so that pressing force, which presses the second tube from the first position toward the second position in the axial direction, is equal to or smaller than 75 N at the first position in the following case. In this case, an average movement velocity of the tube member is set to 500 mm/sec as the second tube moves from the first position to the second position relative to the first tube in the axial direction, With the bicycle seatpost assembly according to the eighteenth aspect, the bicycle seatpost assembly is capable of easily pushing down the second tube with respect to the first tube, even if the average movement velocity of the tube member is set to 500 mm/sec.

In accordance with a nineteenth aspect of the present invention, the bicycle seatpost assembly according to the seventeenth or eighteenth aspect is configured so that pressing force, which presses the second tube from the first position toward the second position in the axial direction, is equal to or smaller than 100 N at the first position in the following case. In this case, an average movement velocity of the tube member is set to 600 mm/sec as the second tube moves from the first position to the second position relative to the first tube in the axial direction, With the bicycle seatpost assembly according to the nineteenth aspect, the bicycle seatpost assembly is capable of easily pushing down the second tube with respect to the first tube, even if the average movement velocity of the tube member is set to 600 mm/sec.

In accordance with a twentieth aspect of the present invention, the bicycle seatpost assembly according to any one of the seventeenth to nineteenth aspect is configured so that an average movement velocity of the tube member is equal to or greater than 600 mm/sec as the second tube moves from the first position to the second position relative to the first tube in the axial direction in the following case. In this case, pressing force, which presses the second tube from the first position toward the second position in the axial direction, is set to 100 N at the first position.

With the bicycle seatpost assembly according to the twentieth aspect, the bicycle seatpost assembly is capable of moving the second tube upwards at sufficiently high speed, even if the pressing force is set to 100 N at the first position.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

Figure 1:
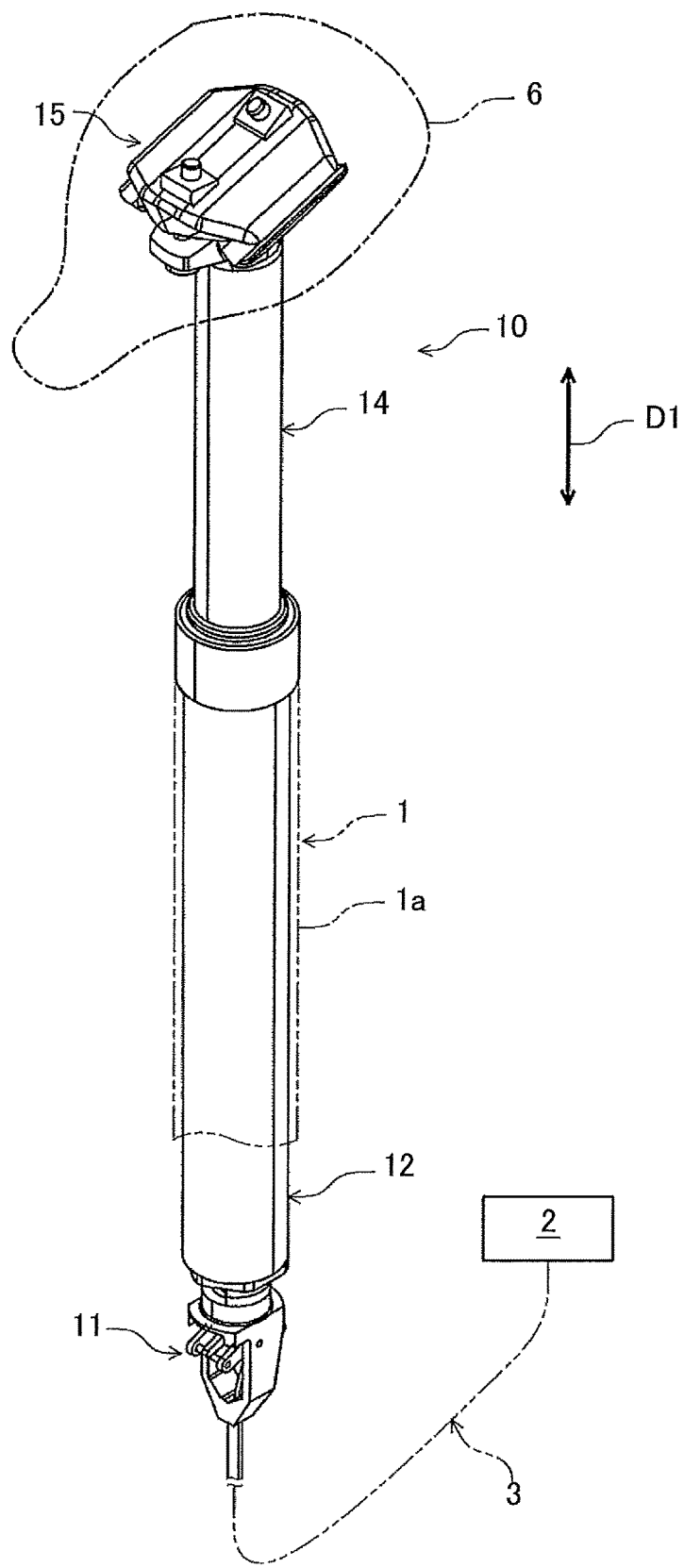
FIG. 1 is a perspective view of a bicycle seatpost assembly in accordance with a first embodiment.

A bicycle seatpost assembly 10 in accordance with a first embodiment will be described below. As shown in FIG. 1, the bicycle seatpost assembly 10 is attached to a bicycle frame 1.

The bicycle seatpost assembly 10 comprises a first tube 12, a second tube 14, and a positioning structure 16 (an example of a fluid flow control structure for a bicycle device).

(First Tube)

Figure 2:
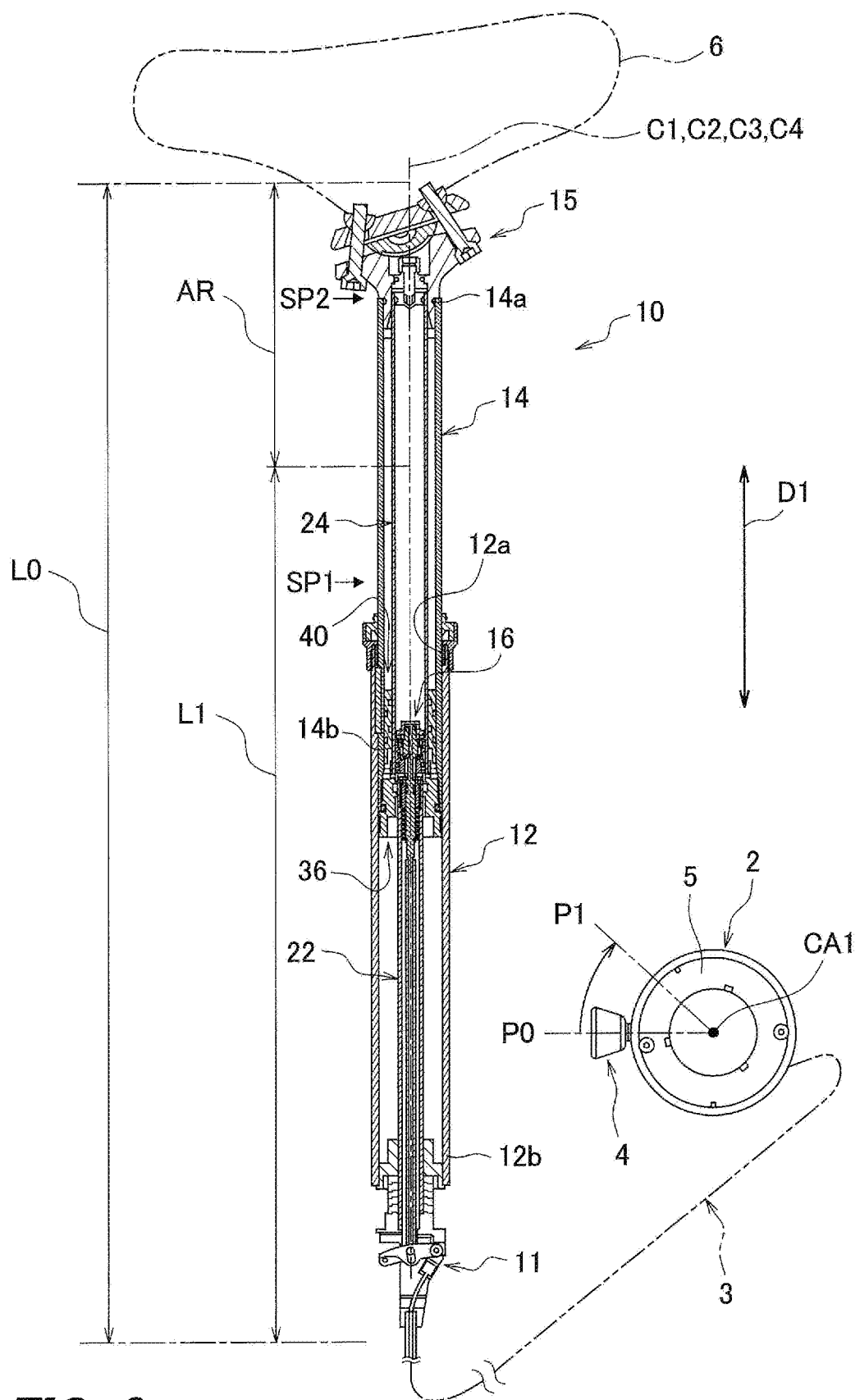
FIG. 2 is a cross-sectional view of the bicycle seatpost assembly illustrated in FIG. 1.

As shown in FIG. 1, the first tube 12 is detachably attached to a seat tube 1a of the bicycle frame 1. For example, the first tube 12 is formed in a substantially cylindrical shape. As shown in FIG. 2, the first tube 12 defines a first center axis C1. The first tube 12 has an opening 12a at one end.

(Second Tube)

The second tube 14 is telescopically received in the first tube 12 in a telescopic direction D1 via the opening 12a of the first tube 12. Specifically, the second tube 14 is inserted into the first tube 12 via the opening 12a of the first tube 12. The telescopic direction D1 corresponds to an axial direction of a first center axis C1 of the first tube 12. Also, the telescopic direction D1 corresponds to an axial direction of a fourth center axis C4 (as described below; an example of a longitudinal axis) of a tube member 24.

As shown in FIG. 2, the second tube 14 is configured to be movable relative to the first tube 12. Specifically, the second tube 14 is configured to be telescopically received in the first tube 12 in the telescopic direction D1.

The second tube 14 defines a second center axis C2. The second center axis C2 is substantially coaxial with the first center axis C1. The second center axis C2 is substantially coaxial with a third center axis C3 of a port 20. Details of the port 20 will be described below.

The telescopic direction D1 is defined by at least one of the first center axis C1, the second center axis C2, and the third center axis C3. In this embodiment, the telescopic direction D1 corresponds to a direction in which the first center axis C1, the second center axis C2, and the third center axis C3 extend.

As shown in FIG. 2, the second tube 14 is formed in a substantially cylindrical shape. The outer diameter of the second tube 14 is smaller than the inner diameter of the first tube 12. The second tube 14 has a distal end 14a and a proximal end 14b. A bicycle seat 6 is to be mounted to the distal end 14a. The proximal end 14b is opposite to the distal end 14a in the telescopic direction D1.

For example, the distal end 14a is an uppermost portion of the second tube 14 in a state where the bicycle seatpost assembly 10 is mounted to the bicycle frame 1 that is in an upright position. The proximal end 14b is a lowermost portion of the second tube 14 in a state where the bicycle seatpost assembly 10 is mounted to the bicycle frame 1 that is in an upright position.

The second tube 14 is movable in the telescopic direction D1 between a first position SP1 and a second position SP2. In the first position SP1, the distal end 14a is closest to the opening 12a of the first tube 12. In the second position SP2, the distal end 14a is farthest to the opening 12a of the first tube 12.

(Mounting Structure)

As shown in FIG. 2, the bicycle seatpost assembly 10 further comprises a mounting structure 15. The mounting structure 15 is configured to fixedly mount a bicycle seat 6 to the second tube 14. For example, the bicycle seat 6 is a saddle. The mounting structure 15 is attached to the distal end 14a of the second tube 14.

(Bicycle Actuation Structure)

As shown in FIG. 2, the bicycle seatpost assembly 10 further comprises a bicycle actuation structure 11. The bicycle actuation structure 11 is configured to actuate the positioning structure 16 in response to operation of the operating device 2.

Specifically, the bicycle actuation structure 11 is operatively coupled to an operating device 2 via a control cable 3 such as a Bowden cable. The bicycle actuation structure 11 is attached to the first tube 12 and transmits an operation force (e.g., pulling force), which is applied from the operating device 2 via the control cable 3, to the first tube 12.

For example, the bicycle actuation structure 11 is provided at a lower end 12b of the first tube 12 in a state where the bicycle seatpost assembly 10 is mounted to the bicycle frame 1 (see FIG. 1) that is in an upright position. The bicycle actuation structure 11 can be provided at other positions in or outside the bicycle seatpost assembly 10. For example, the bicycle actuation structure 11 can be mounted to the distal end 14a of the second tube 14.

(Operating Device)

As shown in FIG. 2, the operating device 2 is configured to operate the control cable 3. For example, the operating device 2 is mounted on a bicycle handlebar (not shown).

The operating device 2 includes an operated member 4 and a base member 5. The operated member 4 is configured to be pivotable relative to the base member 5 from a rest position P0 to an operated position P1 about a pivot axis CA1. Each of the rest position P0 and the operated position P1 is defined based on the pivot axis CA1 of the operated member 4.

The control cable 3 is pulled by pivoting the operated member 4 relative to the base member 5 from the rest position P0 to the operated position P1. The bicycle actuation structure 11 actuates the positioning structure 16, when the control cable 3 is pulled by pivot of the operated member 4.

In this embodiment, the following directional terms "forward", "rearward", "left", "right", "high", "low", "upward" and "downward" as well as any other similar directional terms refer to those directions which are determined on the basis of a rider who sits on the bicycle seat 6 of a bicycle with facing a bicycle handlebar (not shown).

Accordingly, these terms, as utilized to describe the bicycle seatpost assembly 10, should be interpreted relative to a bicycle equipped with the bicycle seatpost assembly 10, when the bicycle is used in an upright riding position on a horizontal surface.

The bicycle seatpost assembly 10 has a maximum overall length L0 and a minimum overall length L1. The overall length of the bicycle seatpost assembly 10 is adjustable within an adjustable range AR defined as a difference between the maximum overall length L0 and the minimum overall length L1.

<General Description of Positioning Structure>

As shown in FIGS. 3 to 5B, the positioning structure 16 is configured to position the first tube 12 and the second tube 14 relative to each other. The positioning structure 16 is configured to be operated via an operating device 2 (see FIG. 2).

The positioning structure 16 includes a locked state and an adjustable state. The positioning structure 16 changes a state of the bicycle seatpost assembly 10 between the locked state and the adjustable state.

Figure 3:
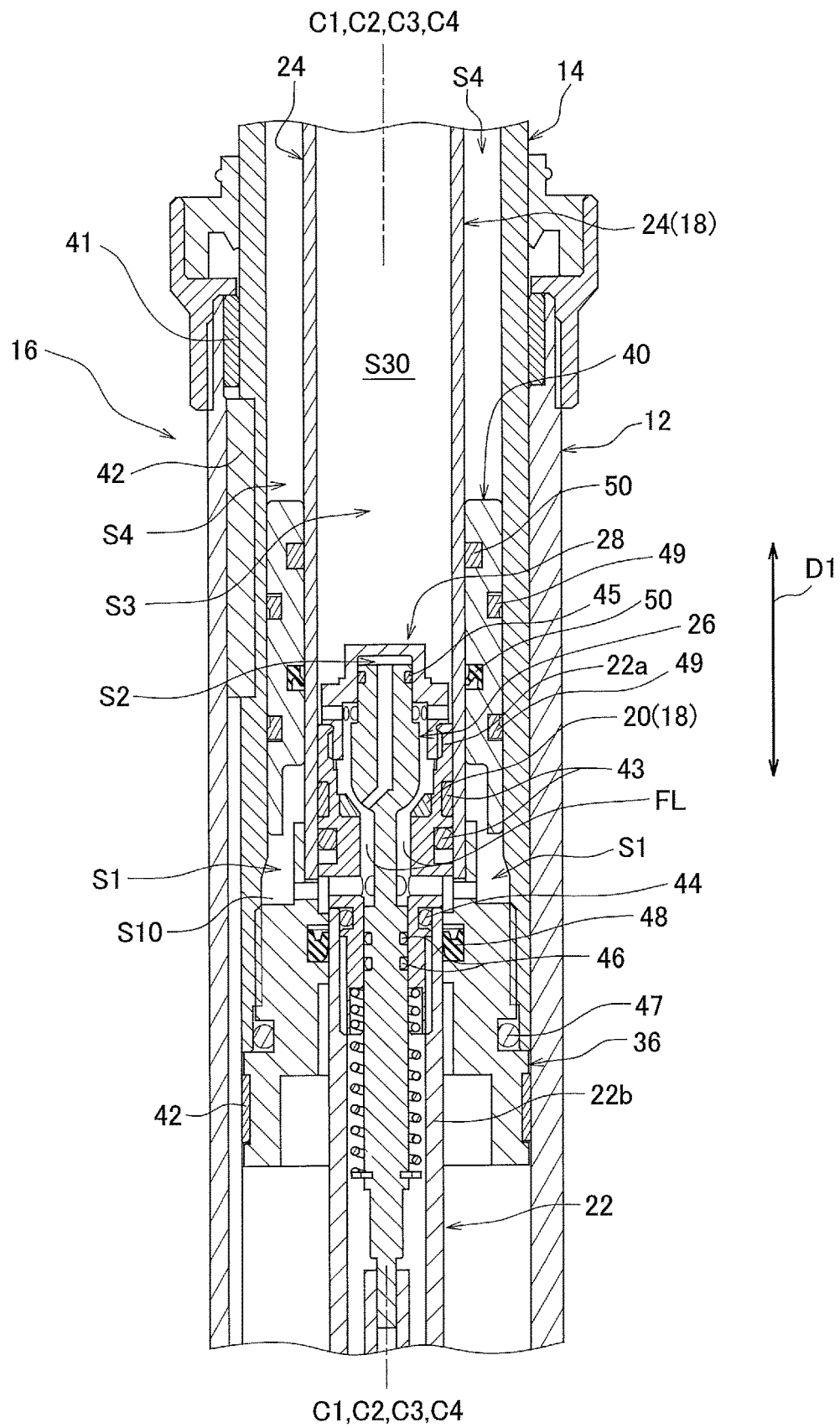
FIG. 3 is a partial cross-sectional view of the bicycle seatpost assembly illustrated in FIG. 1 (a open state where a port is opened)
Figure 4A:
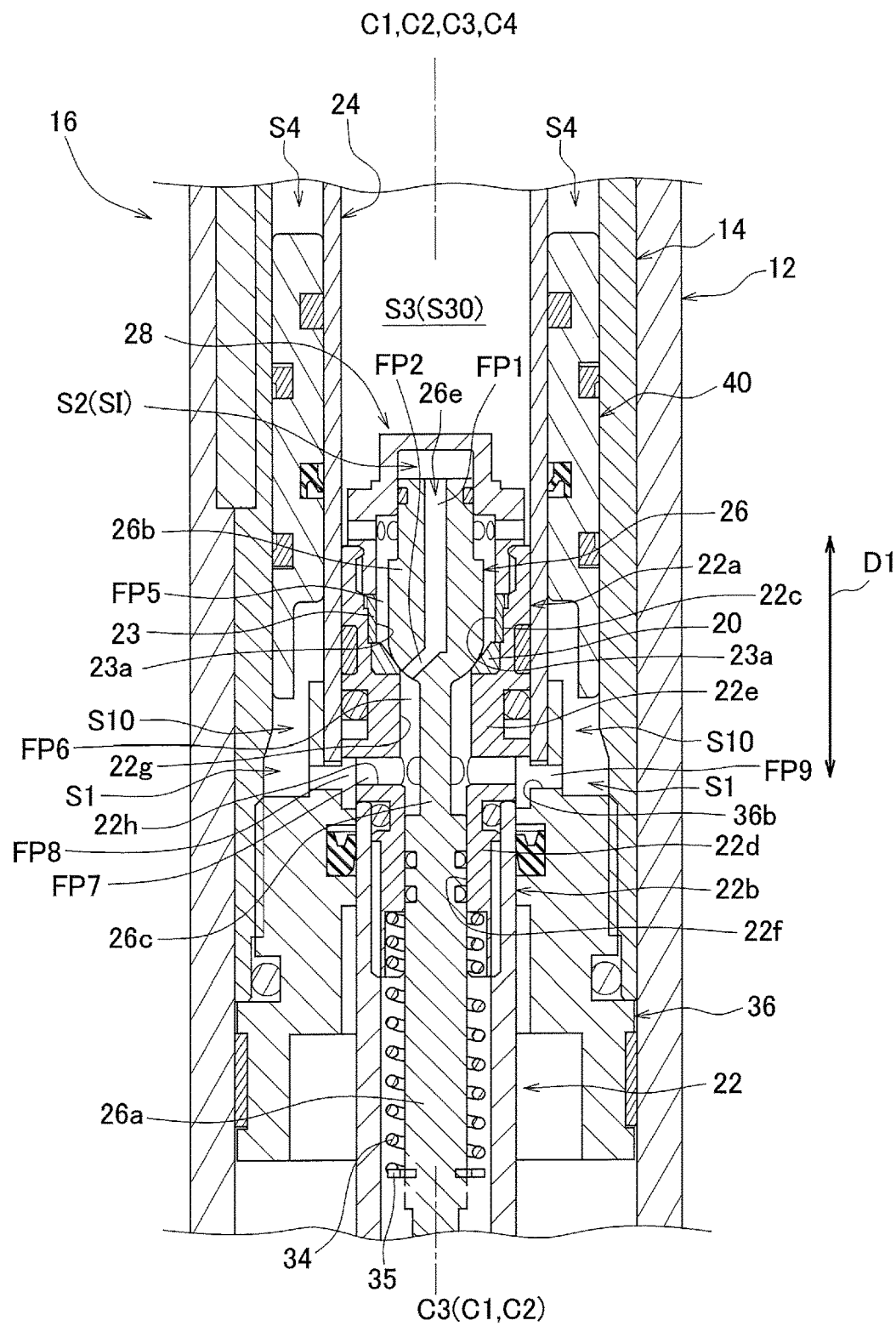
FIG. 4A is an enlarged cross-sectional view of FIG. 3 (a closed state where a port is closed)
Figure 4B:
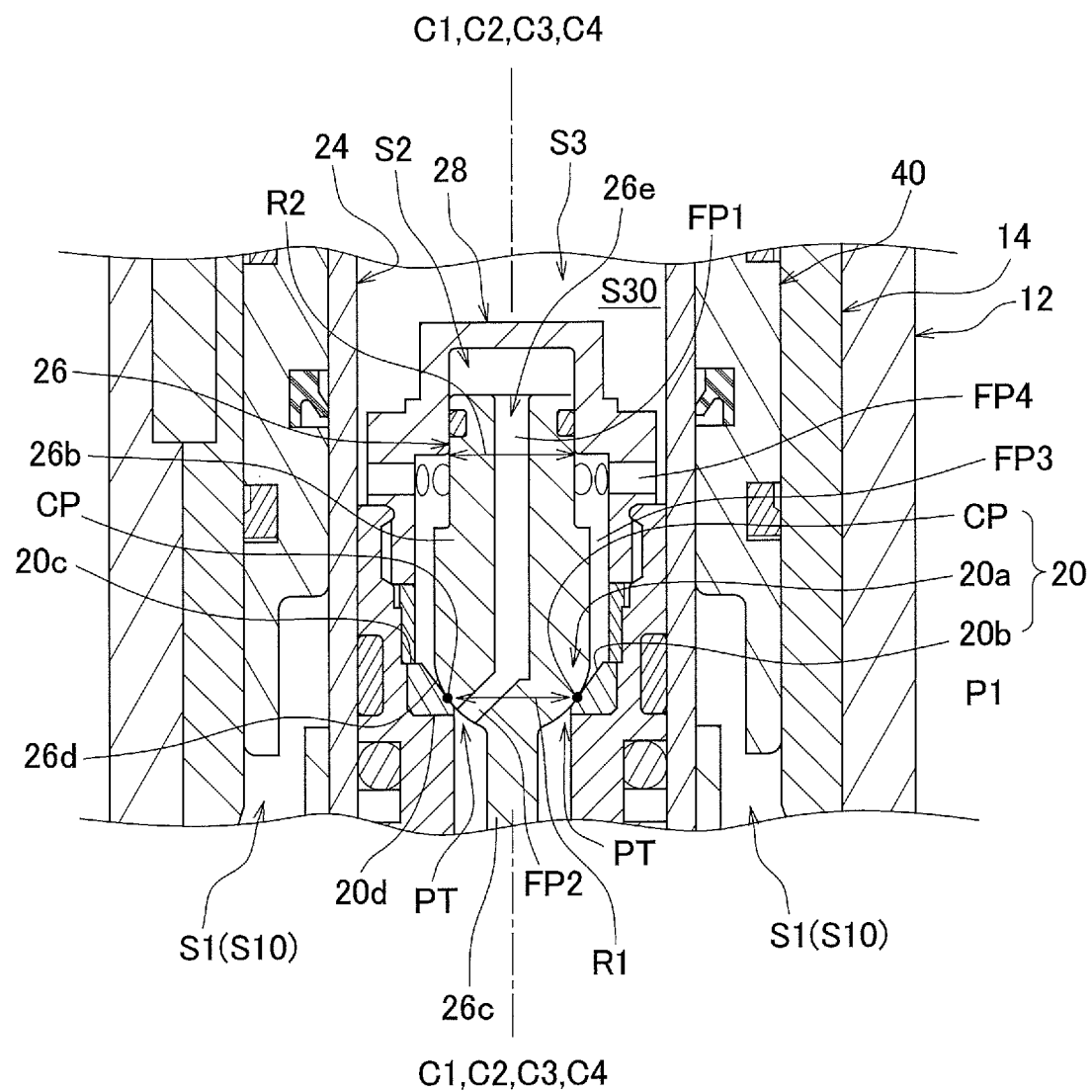
FIG. 4B is a more enlarged cross-sectional view of FIG. 4A.
Figure 5A:
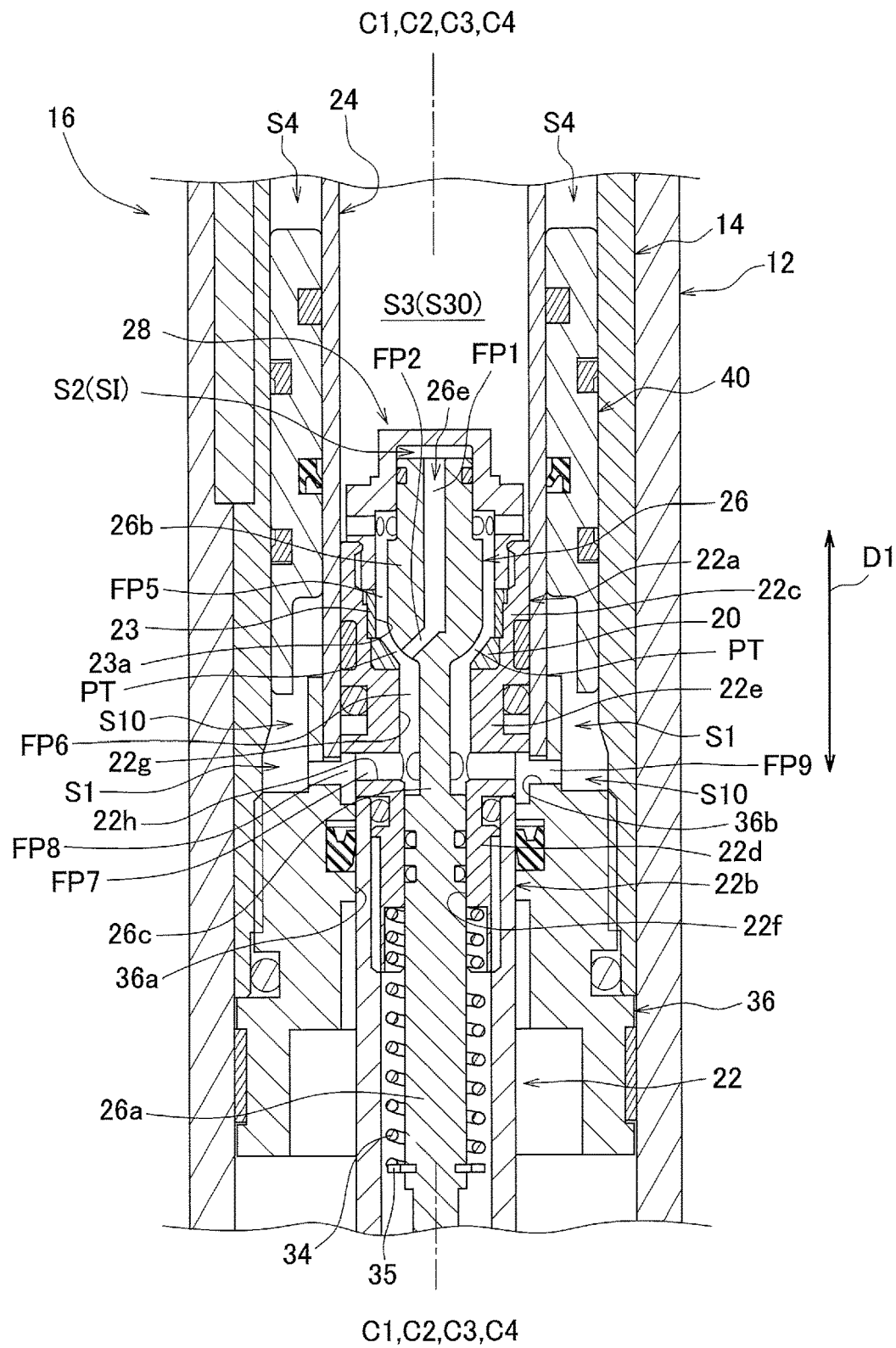
FIG. 5A is an enlarged cross-sectional view of FIG. 3 (the opened state)
Figure 5B:
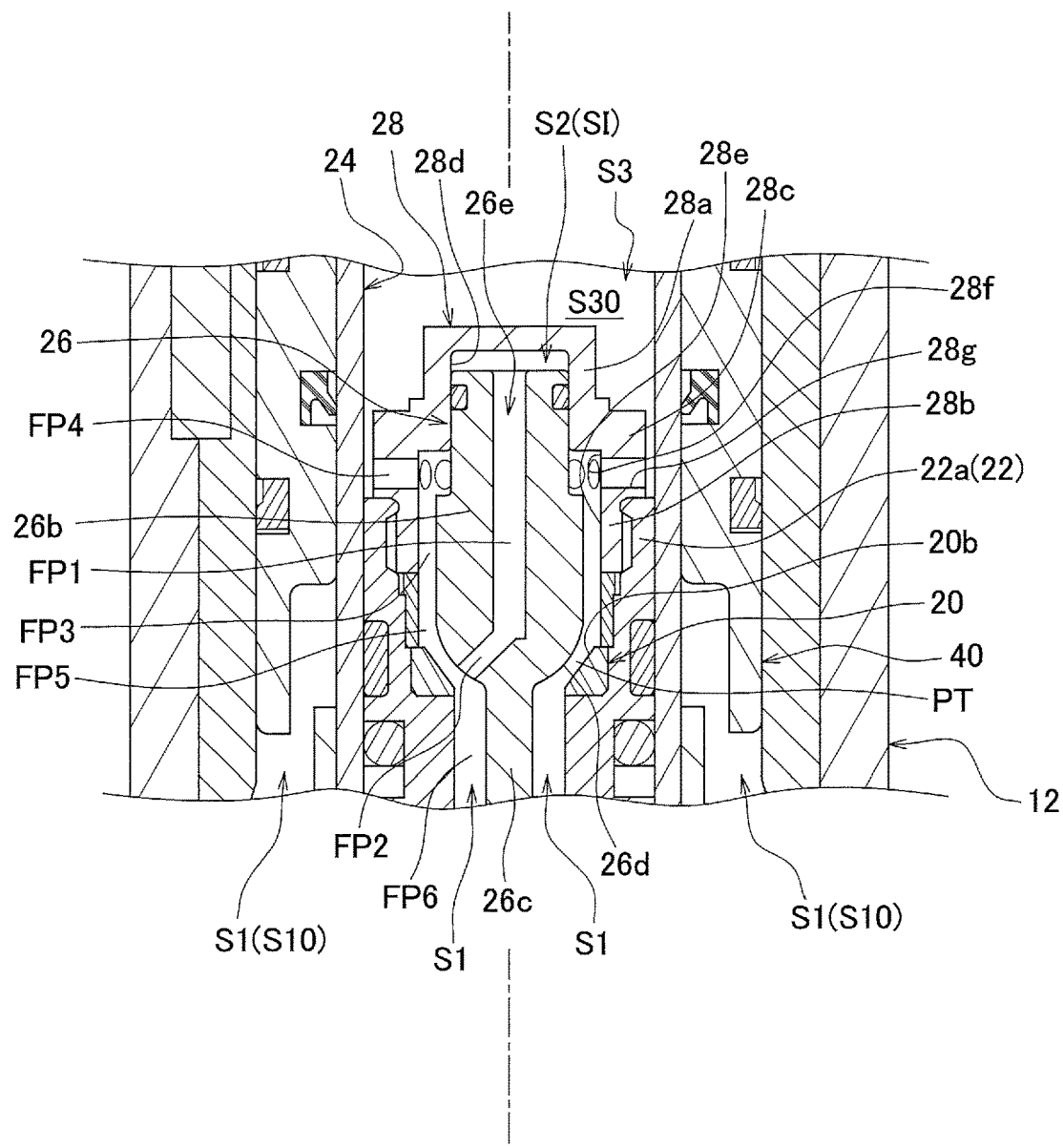
FIG. 5B is a more enlarged cross-sectional view of FIG. 5A.

FIGS. 3, 5A, and 5B show the adjustable state, and FIGS. 4A and 4B show the locked state. In the locked state, as shown in FIGS. 4A and 4B, the second tube 14 is positioned relative to the first tube 12 in the telescopic direction D1. Specifically, in the locked state, the overall length of the bicycle seatpost assembly 10 is maintained at an adjusted overall length. In the locked state, the first tube 12 and the second tube 14 are fixedly positioned relative to each other in the telescopic direction D1.

In the adjustable state, as shown in FIGS. 5A and 5B, a position of the second tube 14 is adjustable relative to the first tube 12 in the telescopic direction D1. Specifically, in the adjustable state, the overall length of the bicycle seatpost assembly 10 is continuously adjustable within the adjustable range AR by operating the operated member 4 to the operated position P1 (see FIG. 2). Namely, in the adjustable state, the positional relationship between the first tube 12 and the second tube 14 is continuously adjustable within the adjustable range AR.

The adjustable state of the bicycle seatpost assembly 10 is not limited to this embodiment. The total length of the bicycle seatpost assembly 10 can be stepwise adjusted in the adjustable state. For example, the total length of the bicycle seatpost assembly 10 can be stepwise adjusted at each of different lengths.

Thus, the positioning structure 16 changes the state of the bicycle seatpost assembly 10 between the locked state and the adjustable state. Specifically, the positioning structure 16 changes the state of the first tube 12 and the second tube 14 between the locked state and the adjustable state.

<Configuration of Positioning Structure>

As shown in FIG. 3, the positioning structure 16 comprises a fluid chamber structure 18 and a piston 22a. The positioning structure 16 further comprises a sealing member 26.

Specifically, the positioning structure 16 comprises the fluid chamber structure 18, and the sealing member 26. The positioning structure 16 further comprises a dividing member 28. The positioning structure 16 further comprises a support portion 22, the tube member 24, a sealing plug 36, and a movable piston 40. The support portion 22 includes the piston 22a as described below.

The positioning structure 16 is configured such that incompressible fluid moves between a first chamber S1 and a third chamber S3 (as describe below). Also, the positioning structure 16 is configured such that the incompressible fluid moves between the first chamber S1 and a second chamber S2.

(Fluid Chamber Structure)

As shown in FIG. 3, the fluid chamber structure 18 includes a tube member 24 at least partly defining a first chamber S1, the third chamber S3 (an example of a second chamber in claims), and a fluid passage FL (an example of a fluid chamber in claims) for changing volumes of the first chamber S1 and the third chamber S3. The fluid chamber structure 18 further includes the port 20.

The fluid chamber structure 18 may include the first chamber S1, the second chamber S2, and the third chamber S3. The first chamber S1, the second chamber S2, and the third chamber S3 include an incompressible fluid. Specifically, the incompressible fluid is filled in each of the first chamber S1, the second chamber S2, and the third chamber S3.

The fluid chamber structure 18 may further includes a fourth chamber S4. The fourth chamber S4 includes a compressible fluid. Specifically, the compressible fluid is filled in the fourth chamber S4.

As shown in FIG. 3, the first chamber S1 is arranged downward from the third chamber S3 and on radially outside of the third chamber S3. For example, the first chamber S1 is defined by the sealing member 26, the support portion 22, the tube member 24, the second tube 14, the sealing plug 36, and the movable piston 40. In this embodiment, the incompressible fluid such as an oil is filled in the first chamber S1.

As shown in FIGS. 4A and 4B, the second chamber S2 is configured to expand as the sealing member 26 is moved toward the port 20 in the telescopic direction D1. As shown in FIGS. 5A and 5B, the second chamber S2 is configured to shrink as the sealing member 26 is moved away from the port 20 in the telescopic direction D1.

The second chamber S2 is arranged between the first chamber S1 and the third chamber S3 in the telescopic direction D1. For example, the second chamber S2 is defined by the sealing member 26 and the dividing member 28. In this embodiment, the incompressible fluid such as an oil is filled in the second chamber S2.

As shown in FIG. 3, the third chamber S3 is configured to be disposed closer to the distal end 14a (see FIG. 2) of the second tube 14 than the first chamber S1. The third chamber S3 is arranged outside the second chamber S2, for example, on the upper side of the second chamber S2. For example, the third chamber S3 is defined by the mounting structure 15 (see FIG. 2), the tube member 24, and the dividing member 28. In this embodiment, the incompressible fluid such as oil is filled in the third chamber S3. Space except for third to fifth fluid passages (described below) functions as a main chamber S30 of the third chamber S3.

As shown in FIG. 3, the fourth chamber S4 is arranged on upper side of the first chamber S1. The fourth chamber S4 is arranged on radially outside of the third chamber S3. For example, the fourth chamber S4 is defined by the tube member 24, the second tube 14, the movable piston 40, and the mounting structure 15 (see FIG. 2).

In this embodiment, the compressible fluid such as air or gas is filled in the fourth chamber S4. The compressible fluid in the fourth chamber S4 biases the movable piston 40 toward the first chamber S1, for example, a main chamber S10 of the first chamber S1.

Figure 6A:
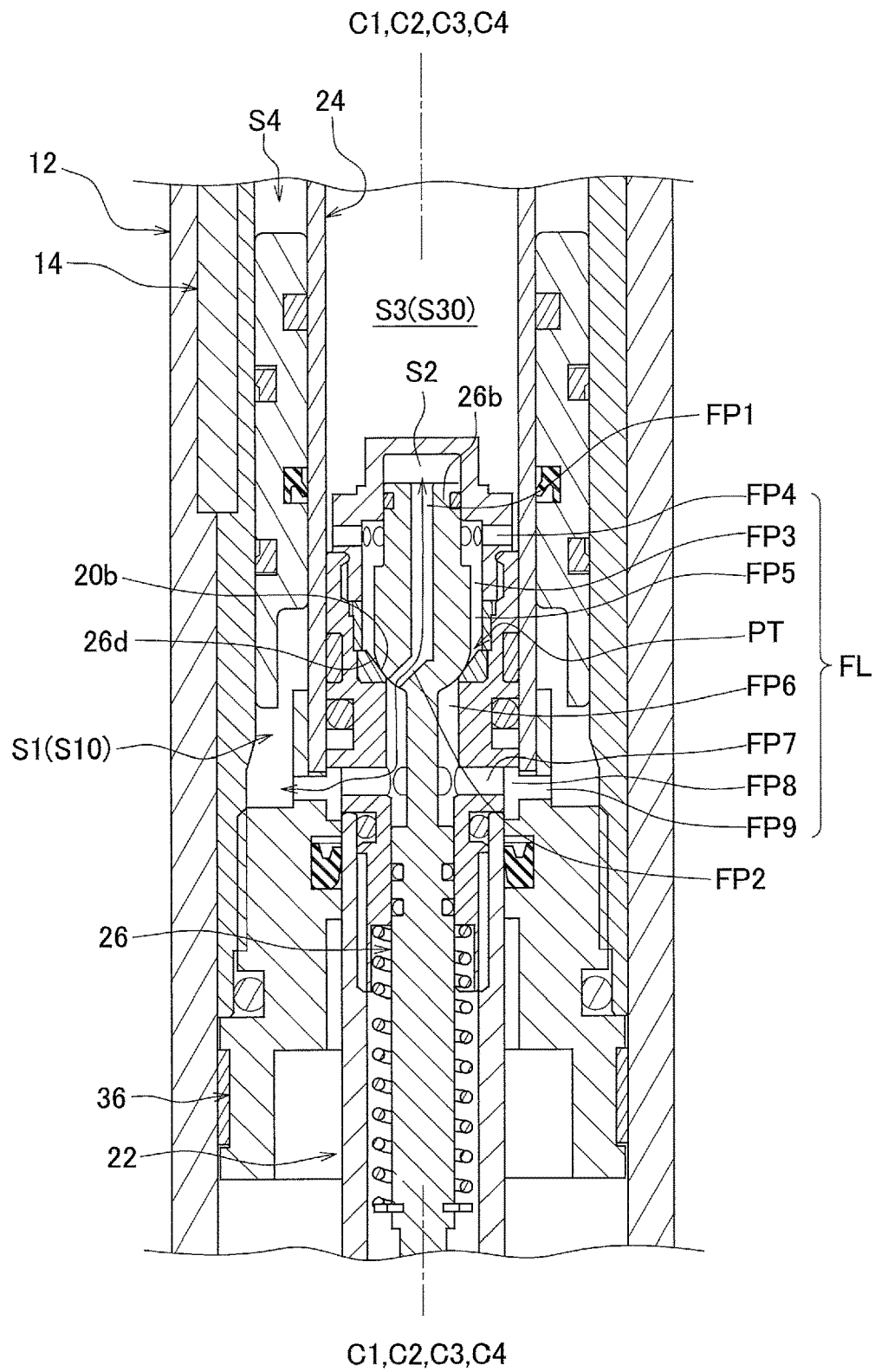
FIG. 6A is an enlarged cross-sectional view of FIG. 3 (the closed state) for explaining fluid passages.
Figure 6B:
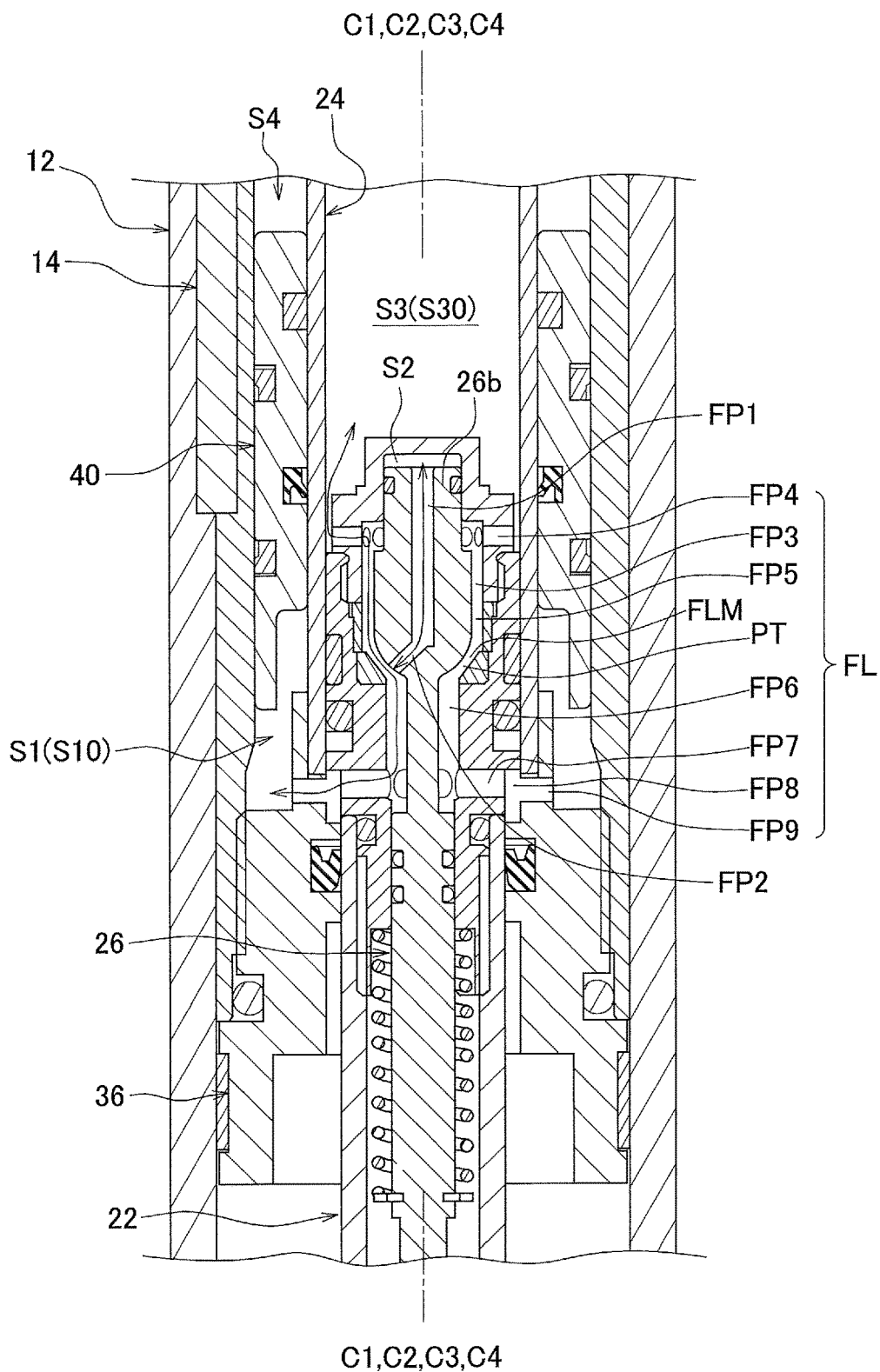
FIG. 6B is an enlarged cross-sectional view of FIG. 3 (the opened state) for explaining fluid passages.

As shown in FIGS. 6A and 6B, the fluid passage FL for changing volumes of the first chamber S1 and third chamber S3 includes the third to ninth fluid passages FP3-FP9 and a variable fluid passage PT (as described below). Specifically, the third to ninth fluid passages FP3-FP9 and the variable fluid passage PT are configured to change volumes of the main chamber S10 of the first chamber S1 and the main chamber S30 of the third chamber S3.

Figure 6C:
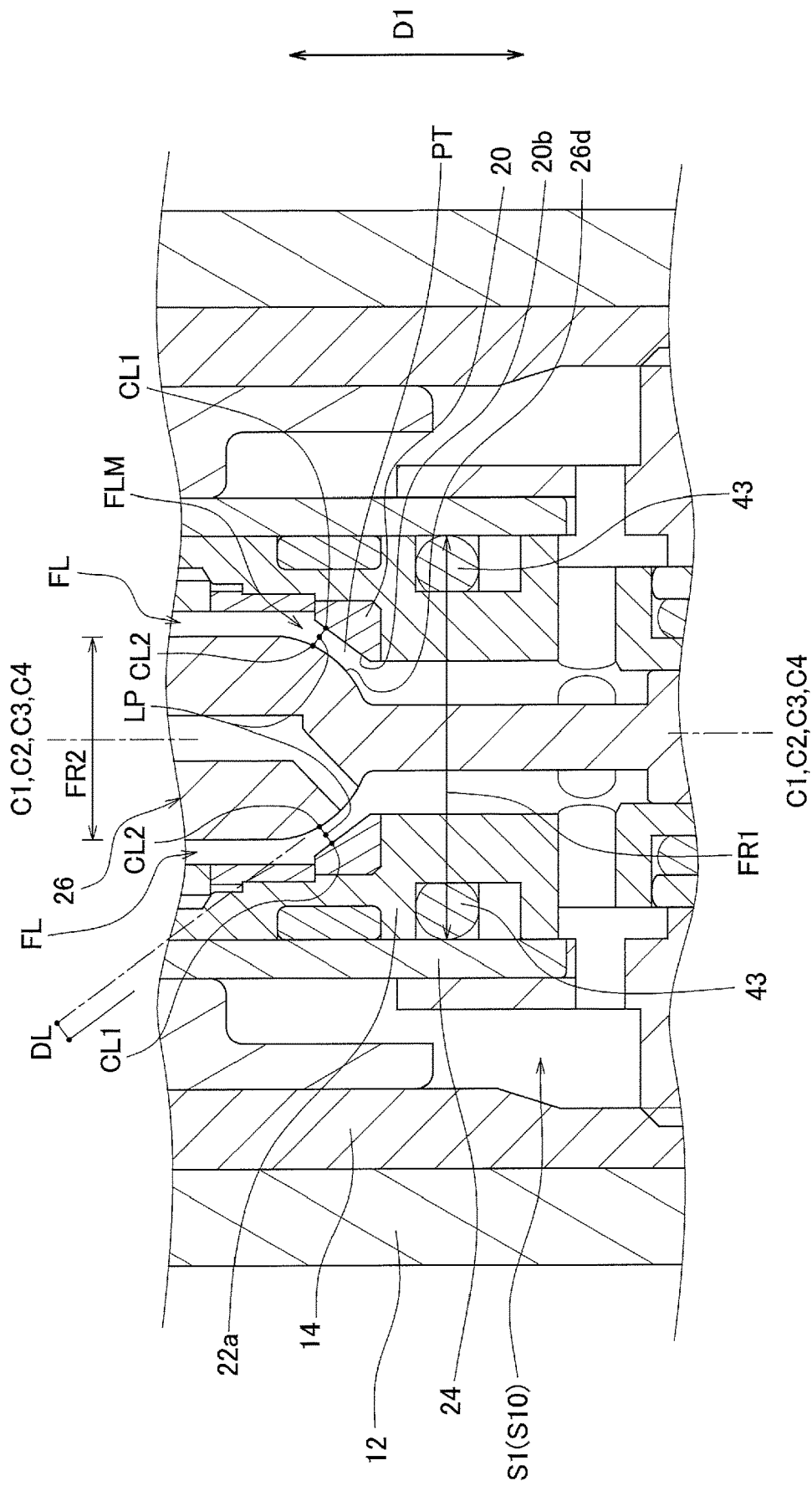
FIG. 6C is an enlarged cross-sectional view of FIG. 6B (the opened state) for explaining an aperture rate.

As shown in FIG. 6C, the fluid passage FL includes a minimum fluid passage FLM. Specifically, the third to ninth fluid passages FP3-FP9 and the variable fluid passage PT includes the minimum fluid passage FLM.

In the embodiment, the variable fluid passage PT includes the minimum fluid passage FLM. In other words, the variable fluid passage PT defines the minimum fluid passage FLM.

The minimum fluid passage FLM is arranged between the port 20 and the sealing member 26, in a state where the sealing member 26 is farthest from the port 20 in the telescopic direction D1.

Specifically, the minimum fluid passage FLM is arranged between the inner peripheral surface of the port 20 and the outer peripheral surface of the sealing member 26 in the above state.

More specifically, the minimum fluid passage FLM is arranged between the first tapered surface 20b (as described below) of the port 20 and the second tapered surface 26d (as described below) of the plug portion 26b (as described below) in the above state.

In the embodiment, the minimum fluid passage FLM is defined by a first circle line CL1 and a second circle line CL2. The first circle line CL1 and the second circle line CL2 are arranged opposed to each other on the minimum fluid passage FLM. The first circle line CL1 is arranged on the port 20, for example, the first tapered surface 20b of the port 20. The second circle line CL2 is arranged on the sealing member 26, for example, on the second tapered surface 26d of the plug portion 26b.

The minimum fluid passage FLM includes a minimum area A. The minimum area A is the smallest area in passing area of fluid flow which passes through the third to ninth fluid passages FP3-FP9 and the variable fluid passage PT. In the embodiment, the minimum area A corresponds to area between the first circle line CL1 and the second circle line CL2. More details of the minimum area A will be described below.

In addition, the minimum fluid passage FLM can be formed in any shape on condition that the minimum area A is the above smallest area. For example, in case that a fourth fluid passage FP4 (described below) or a seventh fluid passage FP7 (described below) includes the minimum fluid passage FLM, the minimum fluid passage FLM can be defined by a plurality of first hole portions 28g (described below) or a plurality of second hole portions 22h (described below). In this case, the minimum area A corresponds to total area of the plurality of first hole portions 28g or total area of the plurality of second hole portions 22h.

(Port)

As shown in FIG. 3, the port 20 is provided on the piston 22a. In other words, the port 20 is formed on the piston 22a. As shown in FIGS. 4A to 5B, the port 20 has a closed state and an open state. In the closed state, the port 20 fluidly separates the first chamber S1 and the third chamber S3 (see FIGS. 4A and 4B). The closed state is a state where the sealing member 26 contacts the port 20. In the closed state, the first chamber S1 and the third chamber S3 are not fluidly communicating with each other. In the open state, the port 20 fluidly connects the first chamber S1 and the third chamber S3 (see FIGS. 5A and 5B). The open state is a state where the sealing member 26 is far away from the port 20.

As shown in FIGS. 3 to 5B, the port 20 is disposed in the support portion 22. Specifically, the port 20 is disposed in a second concave portion 22c (described later) of the support portion 22. More specifically, the port 20 is disposed in the second concave portion 22c of the piston 22a.

For example, the port 20 is formed in a substantially annular shape. As shown in FIGS. 4A to 5B, the port 20 defines the third center axis C3. The port 20 is disposed in the second concave portion 22c of the support portion 22, so that the third center axis C3 is substantially coaxial with the first center axis C1 of the first tube 12 and the second center axis C2 of the second tube 14.

As shown in FIG. 4B, the port 20 includes a first hollow portion 20a and a first tapered surface 20b. The port 20 further includes contact points CP. The first hollow portion 20a is provided along the third center axis C3. The sealing member 26 is disposed in the first hollow portion 20a.

The first tapered surface 20b is configured to contact the sealing member 26 in a closed state (described later) where a variable fluid passage PT is closed. The first tapered surface 20b is formed on an inner peripheral portion of the port 20. For example, the first tapered surface 20b is formed on an inner peripheral portion of the first hollow portion 20a.

As shown in FIG. 4B, the first tapered surface 20b has a first axial end 20c and a second axial end 20d. The first axial end 20c is disposed closer to the second chamber S2 than the second axial end 20d in the telescopic direction D1. The second axial end 20d is disposed closer to the first chamber S1 than the first axial end 20c in the telescopic direction D1.

The first tapered surface 20b is configured such that a diameter of the port 20 decreases from the first axial end 20c toward the second axial end 20d. Specifically, the first tapered surface 20b is configured such that an inner diameter of the port 20 (the first hollow portion 20a) decreases from the first axial end 20c toward the second axial end 20d. In other words, the inner diameter of the first tapered surface 20b decreases from the first axial end 20c toward the second axial end 20d.

As shown in FIG. 4B, the contact points CP are defined on the port 20. Specifically, the contact points CP are defined on the first tapered surface 20b of the port 20.

For example, the contact points CP are defined on a contact line where the second tapered surface 26d (described below) of the sealing member 26 (e.g. a plug portion) contacts the first tapered surface 20b of the port 20.

The contact line is formed on the first tapered surface 20b in a circumferential direction with respect to the third center axis C3. For example, the contact line is formed in a substantially annular shape. The contact line may be zonal.

(Sealing Member)

As shown in FIGS. 4A to 5B, the sealing member 26 is movable relative to the piston 22a in the telescopic direction D1. Specifically, the sealing member 26 is movable relative to the port 20 between an open position (see FIGS. 5A and 5B) to define the open state of the port 20, and a close position (see FIGS. 4A and 4B) to define the closed state of the port 20. More specifically, the plug portion 26b (as described below) of the sealing member 26 is movable relative to the port 20 between the open position and the close position.

The open position of the sealing member 26 is defined in a state where the sealing member 26 is farthest from the port 20 in the telescopic direction D1. The close position of the sealing member 26 is defined in a state where the sealing member 26 contacts the port 20.

The sealing member 26 is disposed in the support portion 22. The sealing member 26 defines the variable fluid passage PT fluidly connecting the first chamber S1 and the third chamber S3 between the sealing member 26 and the port 20.

The variable fluid passage PT is provided between the sealing member 26 and the port 20. Specifically, the variable fluid passage PT is provided between the sealing member 26 and the port 20 when the sealing member 26 is spaced apart from the port 20.

For example, as shown in FIGS. 5A and 5B, the variable fluid passage PT is opened when the sealing member 26 positions at an open position. A state where the variable fluid passage PT is opened, is defined as an opened state. As shown in FIG. 4B, the variable fluid passage PT is closed when the sealing member 26 positions at a close position. A state where the variable fluid passage PT is closed, is defined as a closed state.

As shown in FIGS. 4B and 5B, the sealing member 26 is movable in the telescopic direction D1 between the open position to open the variable fluid passage PT and the close position to close the variable fluid passage PT. The sealing member 26 fluidly connects the first chamber S1 and the second chamber S2 in the close position such that the sealing member 26 fluidly separates the third chamber S3 from the first chamber S1 and the second chamber S2 in the close position.

As shown in FIGS. 4A and 5A, the sealing member 26 is movable relative to the support portion 22 and the first tube 12 in the telescopic direction D1. Specifically, the sealing member 26 is movable relative to the support portion 22 and the first tube 12 via a biasing element 34 in the telescopic direction D1. The biasing element 34 is configured to bias the sealing member 26 toward the closed position.

For example, the position of the sealing member 26 is continuously adjustable relative to the support portion 22 between the closed position and the open position. When the operated member 4 positions at the rest position P0, the sealing member 26 positions at the closed position by a biasing force of the biasing element 34.

When the operated member 4 is operated to position at the operated position P1, the bicycle actuation structure 11 transmits the operation force applied from the operating device 2 to the positioning structure 16. Thereby, the sealing member 26 moves relative to the support portion 22 from the closed position to the open position against a biasing force of the biasing element 34.

As shown in FIG. 4B, the sealing member 26 is arranged in the port 20 so as to contact the first tapered surface 20b of the port 20 in the closed state. As shown in FIG. 5B, the sealing member 26 is arranged in the port 20 so as to be spaced apart from the first tapered surface 20b of the port 20 in the opened state.

As shown in FIGS. 4A and 5A, the sealing member 26 includes a shaft portion 26a, a plug portion 26b, and a constricted portion 26c. The sealing member 26 further includes the second tapered surface 26d.

The shaft portion 26a is integrally formed with the constricted portion 26c. The shaft portion 26a extends in the telescopic direction D1. The shaft portion 26a is disposed in the support portion 22. Specifically, the shaft portion 26a is disposed in a hollow portion (described below) of the support portion 22.

The plug portion 26b is formed in a substantially cylindrical shape. An outer diameter of the plug portion 26b is larger than an outer diameter of the shaft portion 26a. An outer diameter of the plug portion 26b is larger than an outer diameter of the constricted portion 26c.

As shown in FIGS. 4B and 5B, a tip portion of the plug portion 26b is arranged closer to the second chamber S2 than a base end portion of the plug portion 26b in the telescopic direction D1. The base end portion of the plug portion 26b is arranged closer to the first chamber S1 than the tip portion of the plug portion 26b in the telescopic direction D1.

The tip portion of the plug portion 26b is disposed in the dividing member 28. Specifically, the tip portion of the plug portion 26b is disposed in a first concave portion 28a (described below) of the dividing member 28. The base end portion of the plug portion 26b is integrally formed with the constricted portion 26c.

As shown in FIGS. 4B and 5B, the plug portion 26b at least partly faces the port 20 in the telescopic direction D1. Specifically, the base end portion of the plug portion 26b faces the port 20 in the telescopic direction D1.

As shown in FIG. 4B, the plug portion 26b contacts the port 20 at the contact points CP of the port 20 in the closed state. For example, the plug portion 26b contacts the first tapered surface 20b of the port 20 at the contact points CP.

As shown in FIGS. 4B and 5B, the plug portion 26b includes the second tapered surface 26d. The second tapered surface 26d is configured to contact the port 20. Specifically, the second tapered surface 26d is configured to contact the first tapered surface 20b of the port 20 in the closed state. The variable fluid passage PT is closed when the second tapered surface 26d contacts the first tapered surface 20b.

For example, the second tapered surface 26d is formed on the base end portion of the plug portion 26b. Specifically, the second tapered surface 26d is formed on the outer peripheral surface of the base end portion of the plug portion 26b.

The second tapered surface 26d is configured such that an outer diameter of the base end portion of the plug portion 26b decreases from the second chamber S2 side toward the first chamber S1 side. In other words, the outer diameter of the second tapered surface 26d decreases from the plug portion 26b toward the constricted portion 26c.

At least part of the second tapered surface 26d has a curved surface. For example, the second tapered surface 26d has a spherical surface. Specifically, the second tapered surface 26d is formed in a substantially curved shape, for example, a substantially spherical shape. However the second tapered surface 26d can be another shape, such as a conical shape.

The plug portion 26b includes a second hollow portion 26e to fluidly connects the first chamber S1 and the second chamber S2 in the closed state.

As shown in FIGS. 4A and 5A, the second hollow portion 26e extends from the second chamber S2 (or the first chamber S1) to the first chamber S1 (or the second chamber S2). One end of the second hollow portion 26e is configured to communicate with the second chamber S2. The other end of the second hollow portion 26e is configured to communicate with the first chamber S1. The other end of the second hollow portion 26e is disposed radially inward from the contact point CP with respect to the third center axis C3 in the closed state.

As shown in FIGS. 4B and 5B, the second hollow portion 26e includes a first fluid passage FP1 and a second fluid passage FP2. The first fluid passage FP1 communicates with the second chamber S2. For example, the first fluid passage FP1 extends in the telescopic direction D1. An upper portion of the first fluid passage FP1 is connected to the second chamber S2.

The second fluid passage FP2 communicates with the first chamber S1. For example, the second fluid passage FP2 extends from a lower portion of the first fluid passage FP1 toward the first chamber S1.

As shown in FIG. 4B, the lower portion of the second fluid passage FP2 is disposed radially inward from the contact point CP with respect to the third center axis C3 in the closed state. Also, the lower portion of the second fluid passage FP2 is disposed downward from the contact point CP in the closed state. The lower portion of the second fluid passage FP2 is connected to the first chamber S1 which is formed between the constricted portion 26c and the support portion 22.

As shown in FIG. 4B, the sealing member 26 and the first chamber S1 define a first pressure-receiving dimension R1 in a closed state where the variable fluid passage PT is closed. In other words, the first pressure-receiving dimension R1 is defined by the sealing member 26 and the port 20. Specifically, the first pressure-receiving dimension R1 corresponds to a diameter of the contact line.

The sealing member 26 and the second chamber S2 define a second pressure-receiving dimension R2 in the closed state. Specifically, the second pressure-receiving dimension R2 corresponds to the outer diameter of the plug portion 26b in the second chamber S2.

For example, the second pressure-receiving dimension R2 corresponds to the outer diameter of the tip portion of the plug portion 26b. The second pressure-receiving dimension R2 can be defined by an inner diameter of the dividing member 28 (the first concave portion 28a).

The second pressure-receiving dimension R2 is smaller than the first pressure-receiving dimension R1. For example, a ratio of the second pressure-receiving dimension R2 to the first pressure-receiving dimension R1 is equal to or larger than 0.8.

Preferably, the ratio of the second pressure-receiving dimension R2 to the first pressure-receiving dimension R1 is equal to or larger than 0.9. More preferably, the ratio of the second pressure-receiving dimension R2 to the first pressure-receiving dimension R1 is equal to or larger than 0.93.

In this embodiment, the first pressure-receiving dimension R1 is set to 5.322 mm. The second pressure-receiving dimension R2 is set to 5.0 mm. The ratio is set to 0.94.

(Dividing member)

As shown in FIGS. 4A and 5A, the dividing member 28 defines the second chamber S2 between the sealing member 26 and the dividing member 28. Specifically, the dividing member 28 forms the second chamber S2 with the sealing member 26. The dividing member 28 is disposed in the tube member 24. The dividing member 28 is attached to the support portion 22.

The dividing member 28 includes an internal space SI to receive the tip portion of the sealing member 26. Specifically, the dividing member 28 includes an internal space SI to receive the tip portion of the plug portion 26b. The internal space SI provides the second chamber S2.

As shown in FIG. 5B, the dividing member 28 includes the first concave portion 28a, a first mounting portion 28b, and a flange portion 28c.

The first concave portion 28a is configured to receive the tip portion of the sealing member 26, for example, the tip portion of the plug portion 26b. The second chamber S2 is formed by disposing the tip portion of the plug portion 26b in the first concave portion 28a, for example, the internal space SI.

For example, the first concave portion 28a is formed in a substantially bottomed cylindrical shape. The first concave portion 28a includes a third hollow portion 28d. The third hollow portion 28d provides the internal space SI. The third hollow portion 28d is formed by an inner peripheral surface and a bottom surface of the first concave portion 28a.

The plug portion 26b, for example, the tip portion of the plug portion 26b is disposed in the third hollow portion 28d. The tip portion is disposed at intervals from the bottom surface of the third hollow portion 28d. The internal space SI between the tip portion and the third hollow portion 28d forms the second chamber S2.

As shown in FIG. 5B, the first mounting portion 28b is mounted to the support portion 22. Specifically, the first mounting portion 28b is formed in a substantially cylindrical shape. An outer peripheral portion of the first mounting portion 28b is screwed into the support portion 22, for example, the piston 22a of the support portion 22.

The first mounting portion 28b includes a fourth hollow portion 28e. The fourth hollow portion 28e is formed by an inner peripheral surface of the first mounting portion 28b.

The sealing member 26, for example, the plug portion 26b is disposed in the fourth hollow portion 28e. The fourth hollow portion 28e and the plug portion 26b are arranged at intervals with each other in a radial direction with respect to the third center axis C3. Specifically, the inner peripheral surface of the fourth hollow portion 28e and the outer peripheral surface of the plug portion 26b are arranged at intervals with each other in the radial direction.

The space between the inner peripheral surface of the fourth hollow portion 28e and the outer peripheral surface of the plug portion 26b is used as a third fluid passage FP3. The third fluid passage FP3 communicates with a fourth fluid passage FP4 (described below) and a fifth fluid passage FP5 (described below). The third fluid passage FP3 is included in the third chamber S3.

As shown in FIG. 5B, the flange portion 28c is provided between the first concave portion 28a and the first mounting portion 28b. The flange portion 28c is integrally formed with the first concave portion 28a and the first mounting portion 28b. The flange portion 28c is formed in a substantially annular shape.

An outer diameter of the flange portion 28c is larger than an outer diameter of the first mounting portion 28b. Thereby, the flange portion 28c abuts to the support portion 22, for example, the piston 22a of the support portion 22.

The flange portion 28c includes a fifth hollow portion 28f. The fifth hollow portion 28f is formed by an inner peripheral surface of the flange portion 28c.

The sealing member 26, for example, the plug portion 26b is disposed in the fifth hollow portion 28f. The fifth hollow portion 28f and the plug portion 26b are arranged at intervals with each other in the radial direction. Specifically, the inner peripheral surface of the fifth hollow portion 28f and the outer peripheral surface of the plug portion 26b are arranged at intervals with each other in the radial direction.

The flange portion 28c further includes at least one first hole portion 28g. The at least one first hole portion 28g extends from the fifth hollow portion 28f toward radially outside. In this embodiment, for example, each of a plurality of first hole portions 28g is arranged at intervals in the circumferential direction. Each of the plurality of first hole portions 28g extends toward radially outside from the fifth hollow portion 28f.

Each of the plurality of first hole portions 28g is used as the fourth fluid passage FP4. The fourth fluid passages FP4 communicate with the main chamber S30 of the third chamber S3. The fourth fluid passages FP4 communicate with the third fluid passage FP3. The fourth fluid passages FP4 are included in the third chamber S3.

(Support Portion)

As shown in FIG. 2, the support portion 22 is secured to the first tube 12. Specifically, a lower end of the support portion 22 is secured to the first tube 12. The support portion 22 is movable integrally with the first tube 12 relative to the second tube 14 in the telescopic direction D1.

The support portion 22 is disposed in the first tube 12 via the sealing plug 36 and extends in the telescopic direction D1. An upper portion of the support portion 22 is disposed in the tube member 24.

As shown in FIGS. 4A and 5A, the support portion 22 includes the piston 22a and a support member 22b. The piston 22a is movably disposed in the tube member 24 in the telescopic direction D1. Specifically, a large-diameter portion of the piston 22a is movably disposed in the tube member 24 in the telescopic direction D1.

The piston 22a is attached to the support member 22b. For example, the piston 22a is screwed into an inner peripheral surface of the support member 22b. Specifically, a small-diameter portion of the piston 22a is screwed into an inner peripheral surface of the support member 22b.

The piston 22a includes the second concave portion 22c, a second mounting portion 22d, and a connecting portion 22e. The second concave portion 22c is configured to receive the port 20. A bottom portion of the second concave portion 22c is configured to receive the port 20. In other words, the port 20 is disposed on a bottom portion of the second concave portion 22c.

As shown in FIGS. 4A and 5A, a positioning member 23 is disposed between the port 20 and the dividing member 28 in the telescopic direction D1. The positioning member 23 is configured to position the dividing member 28 with respect to the port 20. For example, the positioning member 23 is sandwiched between the dividing member 28 and the port 20.

The positioning member 23 is formed in a substantially annular shape. The positioning member 23 includes a sixth hollow portion 23a. The sixth hollow portion 23a is formed by an inner peripheral surface the positioning member 23.

The sealing member 26, for example, the plug portion 26b is disposed in the sixth hollow portion 23a. The sixth hollow portion 23a and the plug portion 26b are arranged at intervals with each other in the radial direction. Specifically, the inner peripheral surface of the sixth hollow portion 23a and the outer peripheral surface of the plug portion 26b are arranged at intervals with each other in the radial direction.

The space between the inner peripheral surface of the sixth hollow portion 23a and the outer peripheral surface of the plug portion 26b is used as a fifth fluid passage FP5. The fifth fluid passage FP5 communicates with the third fluid passage FP3 and the variable fluid passage PT. The fifth fluid passage FP5 is included in the third chamber S3.

As shown in FIGS. 4A and 5A, the second mounting portion 22d is mounted to the support member 22b. Specifically, an outer peripheral portion of the second mounting portion 22d is screwed into the support member 22b, for example, into an inner peripheral surface of the support member 22b.

The second mounting portion 22d is formed in a substantially cylindrical shape. The second mounting portion 22d includes a seventh hollow portion 22f. The sealing member 26, for example, the shaft portion 26a is disposed in the seventh hollow portion 22f.

The second mounting portion 22d is configured to hold one end of the biasing element 34. Specifically, one end of the biasing element 34 is attached to the second mounting portion 22d. The other end of the biasing element 34 is attached to the sealing member 26 via a locking member 35 such as a C-ring.

The connecting portion 22e is configured to connect the second concave portion 22c and the second mounting portion 22d with each other. The connecting portion 22e is provided between the second concave portion 22c and the second mounting portion 22d in the telescopic direction D1. The connecting portion 22e is integrally formed with the second concave portion 22c and the second mounting portion 22d.

As shown in FIGS. 4A and 5A, the connecting portion 22e is formed in a substantially cylindrical shape. The connecting portion 22e includes an eighth hollow portion 22g. The eighth hollow portion 22g is connected to the bottom portion of the second concave portion 22c.

The sealing member 26, for example, the constricted portion 26c is disposed in the eighth hollow portion 22g. The eighth hollow portion 22g and the constricted portion 26c are arranged at intervals with each other in the radial direction. Specifically, the inner peripheral surface of the eighth hollow portion 22g and the outer peripheral surface of the constricted portion 26c are arranged at intervals with each other in the radial direction.

The space between the inner peripheral surface of the eighth hollow portion 22g and the outer peripheral surface of the constricted portion 26c is used as a sixth fluid passage FP6. The sixth fluid passage FP6 communicates with the variable fluid passage PT and the second fluid passage FP2. The sixth fluid passage FP6 is included in the first chamber S1.

As shown in FIGS. 4A and 5A, the connecting portion 22e includes at least one second hole portion 22h. The at least one second hole portion 22h extends from the eighth hollow portion 22g toward radially outside. In this embodiment, for example, each of a plurality of second hole portions 22h is arranged at intervals in a circumferential direction with respect to the third center axis C3. Each of the plurality of second hole portions 22h extends from the eighth hollow portion 22g toward radially outside.

Each of the plurality of second hole portions 22h is used as a seventh fluid passage FP7. The seventh fluid passages FP7 communicate with the sixth fluid passage FP6. The seventh fluid passages FP7 communicate with the eighth fluid passage FP8 (described below). The seventh fluid passage FP7 is included in the first chamber S1.

The support member 22b is secured to the first tube 12. Specifically, a lower end of the support member 22b is secured to the first tube 12. The support member 22b and the first tube 12 are arranged at intervals with each other in the radial direction. Specifically, an outer peripheral surface of the support member 22b and an inner peripheral surface of the first tube 12 are arranged at intervals with each other in the radial direction.

The support member 22b is formed in a substantially cylindrical shape. The second mounting portion 22d of the piston 22a is screwed into an inner peripheral surface of the support member 22b. The sealing member 26, for example, the shaft portion 26a is disposed in the inner peripheral surface of the support member 22b.

(Tube Member)

As shown in FIG. 2, the tube member 24 is secured to the second tube 14. For example, the tube member 24 is formed in a substantially cylindrical shape. The tube member 24 is disposed in an inner space of the second tube 14 and extends in the telescopic direction D1. The tube member 24 has the fourth center axis C4 (an example of a longitudinal axis). The fourth center axis C4 is substantially coaxial with the first to third center axes C1, C2, C3.

An upper end of the tube member 24 is secured to the second tube 14. The tube member 24 is movable integrally with the second tube 14 relative to the first tube 12 in the telescopic direction D1.

As shown in FIGS. 4A and 5A, an outer diameter of the tube member 24 is larger than an outer diameter of the support member 22b, for example, the outer diameter of a lower portion of the support member 22b. In case that the tube member 24 is disposed on radially outside of the support member 22b, the eighth fluid passage FP8 is formed between the tube member 24 and the support member 22b.

The eighth fluid passage FP8 communicates with the seventh fluid passage FP7, for example, the second hole portions 22h of the support portion 22. The eighth fluid passage FP8 communicates with a ninth fluid passage FP9, for example, at least one third hole portions 36b of the sealing plug 36. The eighth fluid passage FP8 is included in the first chamber S1.

The tube member 24 and the second tube 14 are arranged at intervals with each other in the radial direction. Specifically, the outer peripheral surface of the tube member 24 and the inner peripheral surface of the second tube 14 are arranged at intervals with each other in the radial direction.

As shown in FIGS. 4A and 5A, the movable piston 40 is disposed in the space between the tube member 24 and the second tube 14. The sealing plug 36 is attached to the lower ends of the tube member 24 and the second tube 14. As shown in FIG. 2, the mounting structure 15 is attached to the upper ends of the tube member 24 and the second tube 14.

Thereby, the space between the outer peripheral surface of the tube member 24 and the inner peripheral surface of the second tube 14 is segmented by the movable piston 40. A first segmented space, for example, the segmented upper space corresponds to the fourth chamber S4.

A second segmented space, for example, the segmented lower space is included in the first chamber S1. The second segmented space functions as the main chamber S10 of the first chamber S1.

(Sealing Plug)

As shown in FIGS. 4A and 5A, the sealing plug 36 is configured to seal the incompressible fluid in the first to third chambers S1, S2, S3. The sealing plug 36 is disposed in the space between the support portion 22 and the first tube 12. Specifically, the first tube 12 is formed in a substantially cylindrical shape. The sealing plug 36 is disposed in the space between the outer peripheral surface of the support member 22b and the inner peripheral surface of the first tube 12.

The sealing plug 36 is secured to a lower end of the second tube 14 via a seventh seal member 47 (described below). An outer peripheral surface of the sealing plug 36 is attached to an inner peripheral surface of the second tube 14.

Specifically, the inner peripheral portion of the second tube 14 is screwed into the outer peripheral portion of the sealing plug 36. The sealing plug 36 is configured to receive the tube member 24. Specifically, the sealing plug 36 is attached to the tube member 24, for example, by a press fitting means. The sealing plug 36 may merely press the tube member 24 in the axial direction without being fixed to the tube member 24.

The sealing plug 36 includes the tenth hollow portion 36a. The support member 22b is disposed in the tenth hollow portion 36a via eighth seal members 48 (described below).

The sealing plug 36 is movable along the support member 22b in the telescopic direction D1. The sealing plug 36 is movable integrally with the second tube 14 and the tube member 24 relative to the first tube 12 in the telescopic direction D1.

The sealing plug 36 further includes at least one third hole portion 36b. The at least one third hole portion 36b extends from the eighth fluid passage FP8 toward radially outside. In this embodiment, for example, each of a plurality of third hole portions 36b is arranged at intervals in a circumferential direction with respect to the telescopic direction D1. Each of the plurality of third hole portions 36b extends from the eighth fluid passage FP8 toward radially outside.

Each of the plurality of third hole portions 36b is used as the ninth fluid passage FP9. The ninth fluid passages FP9 communicate with the eighth fluid passage FP8. The ninth fluid passages FP9 communicate with the main chamber S10 of the first chamber S1, which is formed by an inner space between the tube member 24, the second tube 14, the sealing plug 36, and the movable piston 40. The ninth fluid passage FP9 is included in the first chamber S1.

(Movable Piston)

The movable piston 40 is configured to be movable between the second tube 14 and the tube member 24 in the telescopic direction D1. The movable piston 40 is configured to be movable between the first chamber S1 and the fourth chamber S4 in the telescopic direction D1.

As shown in FIGS. 4A and 5A, the movable piston 40 is disposed between the second tube 14 and the tube member 24 in the radial direction. The movable piston 40 is disposed between the first chamber S1 and the fourth chamber S4 and is movable between the first chamber S1 and the fourth chamber S4 so as to change a volume ratio between the first chamber S1 and the fourth chamber S4.

Specifically, the movable piston 40 is formed in a substantially cylindrical shape. The movable piston 40 is disposed in the space between the inner peripheral surface of the second tube 14 and the outer peripheral surface of the tube member 24 in the radial direction.

As shown in FIG. 6A, in the closed state, the variable fluid passage PT is closed. In the closed state, the incompressible fluid is immovable between the first and second chambers S1 and S2 and the third chamber S3, and is substantially stable in the first chamber S1 and the second chamber S2. Also, the movable piston 40 is substantially stable.

In this state, the sealing member 26, for example, the plug portion 26b (e.g. the second tapered surface 26d) abuts to the port 20 (e.g. the first tapered surface 20b). As the operated member 4 is pivoted from the rest position P0 to the operated position P1, the sealing member 26 moves upward via the bicycle actuation structure 11.

Thereby, the plug portion 26b of the sealing member 26 is moved away from the port 20 and the variable fluid passage PT is set in the opened state. When the variable fluid passage PT is set in the opened state, the movable piston 40 is movable.

As shown in FIG. 6B, in the opened state, the variable fluid passage PT is opened. In the opened state, the incompressible fluid moves between the first and second chambers S1, S2 and the third chamber S3, as the first tube 12 and the second tube 14 moves integrally with the sealing plug 36 with respect to the support portion 22 and the dividing member 28 in the telescopic direction D1.

Then, the movable piston 40 moves in the telescopic direction D1 by the movement of the incompressible fluid or by pressure of the compressible fluid.

For example, as the movable piston 40 moves downward by the pressure of the compressible fluid, the incompressible fluid moves from the first chamber S1 to the third chamber S3. In this case, the fourth chamber S4 expands, the first chamber S1 shrinks, and the third chamber S3 expands. Thereby, the bicycle seat 6 moves upward.

For example, as the movable piston 40 moves upward by movement of the incompressible fluid, the incompressible fluid moves from the third chamber S3 to the first chamber S1. In this case, the fourth chamber S4 shrinks, the first chamber S1 expands, and the third chamber S3 shrinks. Thereby, the bicycle seat 6 moves downward.

In this embodiment, the positioning structure 16 includes the second chamber S2. The first pressure-receiving dimension R1 and the second pressure-receiving dimension R2 are defined in the positioning structure 16. The second pressure-receiving dimension R2 is smaller than the first pressure-receiving dimension R1, and the ratio of the second pressure-receiving dimension R2 to the first pressure-receiving dimension R1 is set as described above.

This configuration enables the sealing member 26 to easily move upward and separate away from the port 20. In other words, this configuration enables the state of the variable fluid passage PT to be easily changed from the closed state to the opened state.

(Seal Member)

As shown in FIG. 3, the positioning structure 16 includes a plurality of seal members. For example, the plurality of seal members includes first to tenth seal members 41-50.

A first seal member 41 is attached to an inner peripheral portion of the first tube 12. A second seal member 42 is attached to an outer peripheral portion of the second tube 14. The first seal member 41 and the second seal member 42 seal clearance between the first tube 12 and the second tube 14.

Third and fourth seal members 43, 44 are attached to an outer peripheral portion of the piston 22a of the support portion 22. The third seal member 43 seals the clearance between the tube member 24 and the piston 22a of the support portion 22. The fourth seal member 44 seals the clearance between the piston 22a of the support portion 22 and the support member 22b of the support portion 22.

The fifth seal member 45 is attached to an outer peripheral portion of the sealing member 26, for example, the outer peripheral portion of the plug portion 26b. The fifth seal member 45 seals the clearance between the plug portion 26b and the first concave portion 28a.

The sixth seal members 46 are attached to an outer peripheral portion of the sealing member 26, for example, the outer peripheral portion of the shaft portion 26a. The sixth seal member 46 seals the clearance between the shaft portion 26a and the support member 22b.

The seventh seal member 47 is attached to an outer peripheral portion of the sealing plug 36. The seventh seal member 47 seals the clearance between the sealing plug 36 and the second tube 14.

The eighth seal members 48 are attached to the tenth hollow portion 36a of the sealing plug 36. The eighth seal members 48 seal the clearance between the sealing plug 36 and the support member 22b.

The ninth seal members 49 are attached to an outer peripheral portion of the movable piston 40. The ninth seal members 49 seal the clearance between the movable piston 40 and the second tube 14.

The tenth seal members 50 are attached to an inner peripheral portion of the movable piston 40. The tenth seal members 50 seal the clearance between the movable piston 40 and the tube member 24.

<Aperture Rate of the Positioning Structure and Characteristic of the Fluid>

(Aperture Rate)

An aperture rate is set as follows for moving the tube member 24 with respect to the piston 22a by smaller force than the conventional fluid flow control structure.

The aperture rate AT is defined by dividing an area A of the minimum fluid passage FLM by a flow rate Q. The aperture rate AT is calculated with a formula: AT=A/Q. The aperture rate AT is equal to or greater than 0.1. The aperture rate AT is equal to or smaller than 0.6. Preferably, the aperture rate AT is equal to or smaller than 0.35. More preferably, the aperture rate AT is equal to or smaller than 0.15. In the embodiment, the aperture rate AT is set to 0.13.

The above aperture rate AT is defined based on the following condition of the minimum area A and flow rate Q. The minimum area A of the minimum fluid passage FLM corresponds to the above minimum area of the minimum fluid passage FLM.

For example, the minimum area A is defined by the open state of the port 20. For example, as shown in FIG. 6C, the minimum fluid passage FLM is defined by the first circle line CL1 and the second circle line CL2 in the open state.

In the embodiment, the minimum area A corresponds to area between the first circle line CL1 and the second circle line CL2 which define the minimum fluid passage FLM. For example, the minimum area A is calculated by multiplying a distance DL between the first circle line CL1 and the second circle line CL2 and a circumference (=π*FR2) of a circle passing through a center line LP between the first circle line CL1 and the second circle line CL2 together. In other word, the minimum area A is calculated with a formula: A=DL*π*FR2. "FR2" is a diameter of the circle defined by the center line LP.

The minimum area A (the area A of the minimum fluid passage FLM) is equal to or greater than 13 mm$^2$. Preferably, the minimum area A is equal to or greater than 15 mm$^2$. In the embodiment, the minimum area A is set to 15 mm$^2$.

The flow rate Q is defined by fluid volume VL (mm$^3$) passing through the minimum fluid passage FLM as the tube member 24 moves relative to the piston 22a at 1.0 mm.

The flow rate Q is defined based on an outer diameter FR1 of the piston 22a. Specifically, the flow rate Q is defined based on the outer diameter FR1 of the large-diameter portion of the piston 22a. For example, the flow rate Q is calculated by multiplying pi (π), the radius (FR1/2) of the large-diameter portion of the piston 22a squared, and 1.0 mm. In other words, the flow rate Q is calculated with a formula: $Q=\pi*(FR1^2/4)$.

In the embodiment, the outer diameter FR1 of the piston 22a is defined by an outer diameter of the third seal member 43 which is included in the piston 22a, for example, the large-diameter portion. The third seal member 43 contacts the inner peripheral surface of the tube member 24.

For example, the outer diameter FR1 of the piston 22a is equal to or greater than 8.0 mm. Preferably, the outer diameter FR1 of the piston 22a is equal to or smaller than 30 mm. In the embodiment, the outer diameter FR1 of the piston 22a is set to 12 mm.

Alternatively, the flow rate Q can be defined based on the internal diameter of the tube member 24 which is opposed to the piston 22a in a radial direction with respect to the fourth center axis C4. In the illustrated embodiment, the internal diameter is the substantially same as the outer diameter FR1 of the piston 22a.

(Fluid's Characteristic)

The incompressible fluid includes kinematic viscosity as follows. The kinematic viscosity of fluid in the fluid passage FL is equal to or smaller than 50 mm$^2$/sec at 40 degrees Celsius. Preferably, the kinematic viscosity is equal to or smaller than 10 mm$^2$/sec at 40 degrees Celsius.

Specifically, the kinematic viscosity of fluid in the third to ninth fluid passages FP3-FP9 and the variable fluid passage PT is set to the above ranges at 40 degrees Celsius. More specifically, the kinematic viscosity of fluid in the first to ninth fluid passages FP1-FP9 and the variable fluid passage PT is set to the above ranges at 40 degrees Celsius. In the embodiment, the kinematic viscosity of fluid is set to 8.0 mm$^2$/sec at 40 degrees Celsius.

The Reynolds number RE of fluid in the fluid passage FL is set as follows. The Reynolds number RE is defined by the kinematic viscosity v, velocity V of fluid, and an outer diameter FR1 of the piston 22a. For example, the Reynolds number RE is calculated by multiplying the velocity V of fluid, the outer diameter FR1 of the piston 22a, and an inverse number of the kinematic viscosity v. The velocity V of fluid is defined by the averaged velocity of fluid in the fluid passage FL. In other word, the Reynolds number RE is calculated with a formula: $RE=V*FR1/v$.

The Reynolds number RE of fluid in the fluid passage FL is equal to or greater than 100. Preferably, the Reynolds number RE is equal to or greater than 150. In the embodiment, the Reynolds number RE is set to 875, in case that the kinematic viscosity of fluid is set to 8.0 mm$^2$/sec at 40 degrees Celsius. In addition, the Reynolds number RE can be set in a range between 160 and 200, in case that the kinematic viscosity of fluid is set to 50 mm$^2$/sec at 40 degrees Celsius.

Specifically, the Reynolds number RE of fluid in the third to ninth fluid passages FP3-FP9 and the variable fluid passage PT is set to the above ranges at 40 degrees Celsius. More specifically, the Reynolds number RE of fluid in the first to ninth fluid passages FP1-FP9 and the variable fluid passage PT is set to the above ranges at 40 degrees Celsius.

<Operation of Positioning Structure>

(Opened State)

In the opened state, the bicycle seat 6 is movable upward with respect to the first tube 12 and the support portion 22, for example, the support member 22b, by the positioning structure 16.

As shown in FIG. 6B, the incompressible fluid moves from the first chamber S1 to the third chamber S3 via the variable fluid passage PT. The first chamber S1 and the second chamber S2 communicate with each other.

Specifically, the incompressible fluid moves from the main chamber S10 of the first chamber S1 to the main chamber S30 of the third chamber S3, by passing through the fluid passages in order of the ninth fluid passage FP9, the eighth fluid passage FP8, the seventh fluid passage FP7, the sixth fluid passage FP6, the variable fluid passage PT, the fifth fluid passage FP5, the third fluid passage FP3, and the fourth fluid passage FP4.

More specifically, the incompressible fluid moves from the main chamber S10 of the first chamber S1 to the main chamber S30 of the third chamber S3 via the above fluid passages FP3-FP9 and PT when the movable piston 40 moves downward by expansion of the compressible fluid in the fourth chamber S4.

The main chamber S10 of the first chamber S1 is shrunk by an outflow of the incompressible fluid from therein, and the main chamber S30 of the third chamber S3 is expanded by an inflow of the incompressible fluid to therein. Thereby, the bicycle seat 6 moves upward by expansion of the compressible fluid in the fourth chamber S4.

When the bicycle seat 6 is pushed down in the opened state, as shown in FIG. 6B, the incompressible fluid moves from the third chamber S3 to the first chamber S1 via the variable fluid passage PT. The first chamber S1 and the second chamber S2 communicate with each other.

Specifically, the incompressible fluid moves from the main chamber S30 of the third chamber S3 to the main chamber S10 of the first chamber S1, by passing through the fluid passages in order of the fourth fluid passage FP4, the third fluid passage FP3, the fifth fluid passage FP5, the variable fluid passage PT, the sixth fluid passage FP6, the seventh fluid passage FP7, the eighth fluid passage FP8, and the ninth fluid passage FP9.

The main chamber S30 of the third chamber S3 is shrunk by an outflow of the incompressible fluid from therein, and the main chamber S10 of the first chamber S1 is expanded by an inflow of the incompressible fluid to therein. Then, the movable piston 40 moves upward by expansion of the main chamber S10 of the first chamber S1, and the compressible fluid in the fourth chamber S4 is shrunk by the movement of the movable piston 40. Thereby, the bicycle seat 6 moves downward.

(Closed State)

In the closed state, the bicycle seat 6 is held at an adjusted height position where a bicycle user sets. In this case, the incompressible fluid doesn't move between the first chamber S1 and the third chamber S3, because the variable fluid passage PT is closed by the positioning structure 16. As shown in FIG. 6A, the first chamber S1 and the second chamber S2 communicate with each other.

Thereby, the incompressible fluid in the first chamber S1 and the second chamber S2 is substantially stable. In other words, the bicycle seat 6 is held at the adjusted height position.

<Relationship Between Pressing Force and Movement Velocity of the Tube Member>

The bicycle seatpost assembly 10 includes the following relationship between pressing force of the second tube 14 and movement velocity of the tube member 24.

The pressing force corresponds to reaction force in an upward direction of the telescopic direction D1 which generates on the second tube 14, in case that the second tube 14 is pressed by an external force in a downward direction of the telescopic direction D1 at the first position SP1.

The moving velocity corresponds to the average moving velocity of the tube member 24, in case that the second tube 14 moves in the upward direction of the telescopic direction D1 from the first position SP1 to the second position SP2 relative to the first tube 12.

The bicycle seatpost assembly 10 is configured so that pressing force, which presses the second tube 14 from the first position SP1 toward the second position SP2 in the telescopic direction D1, is equal to or smaller than 75 N at the first position SP1 in the following case. In this case, an average movement velocity of the tube member 24 is set to 500 mm/sec as the second tube 14 moves from the first position SP1 to the second position SP2 relative to the first tube 12 in the telescopic direction D1.

Preferably, the bicycle seatpost assembly 10 is configured so that pressing force, which presses the second tube 14 from the first position SP1 toward the second position SP2 in the telescopic direction D1, is equal to or smaller than 100 N at the first position SP1 in the following case. In this case, an average movement velocity of the tube member 24 is set to 600 mm/sec as the second tube 14 moves from the first position SP1 to the second position SP2 relative to the first tube 12 in the telescopic direction D1.

Also, the bicycle seatpost assembly 10 is configured so that an average movement velocity of the tube member 24 is equal to or greater than 600 mm/sec as the second tube 14 moves from the first position SP1 to the second position SP2 relative to the first tube 12 in the telescopic direction D1 in the following case. In this case, pressing force, which presses the second tube 14 from the first position SP1 toward the second position SP2 in the telescopic direction D1, is set to 100 N at the first position SP1.

Second Embodiment

Figure 7:
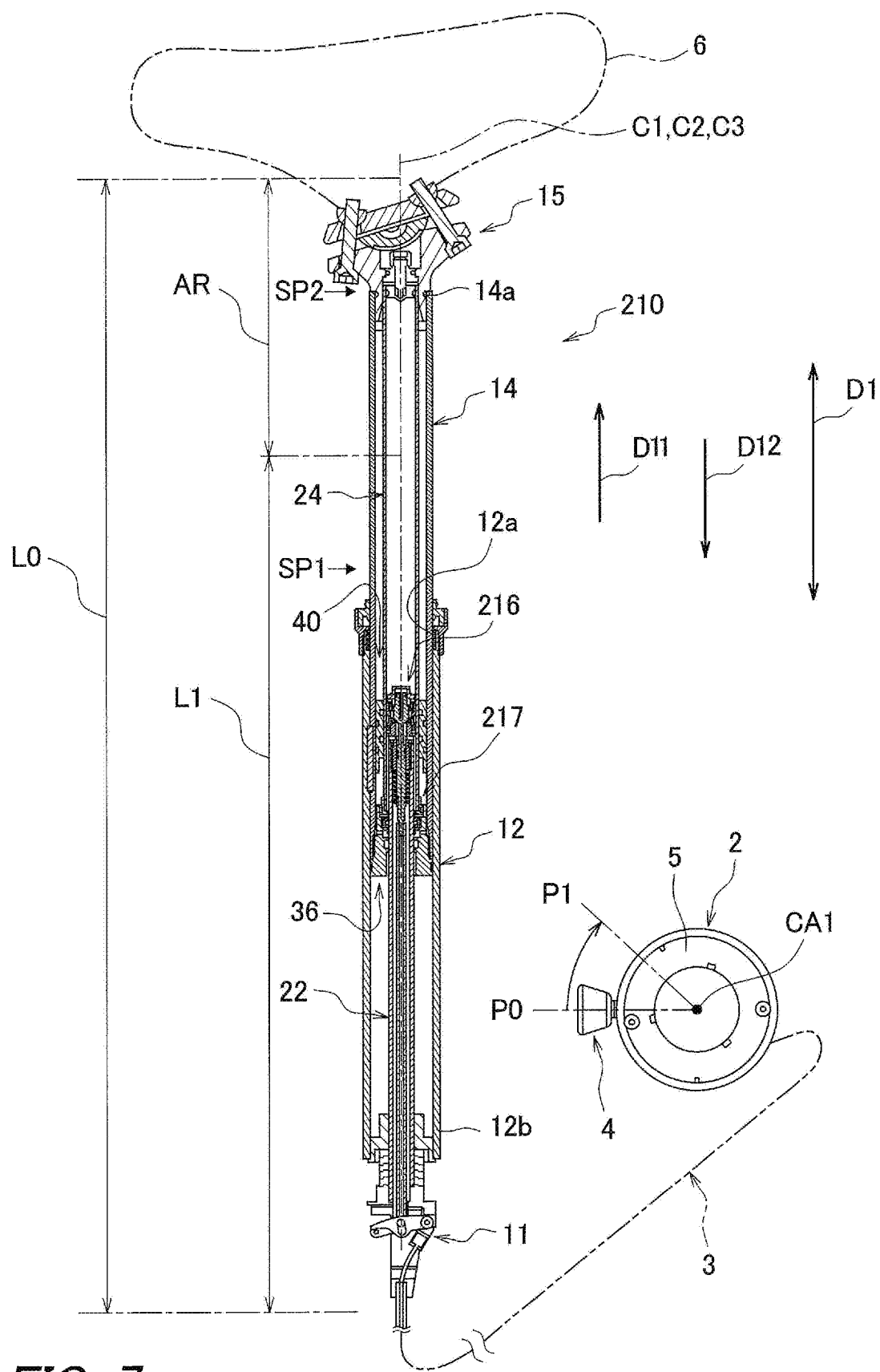
FIG. 7 is a cross-sectional view of a bicycle seatpost assembly in accordance with a second embodiment.

As shown in FIG. 7, a bicycle seatpost assembly 210 in accordance with a second embodiment will be described below. The bicycle seatpost assembly 210 has substantially the same structures as those of the bicycle seatpost assembly 10 except for the positioning structure 216. Thus, elements having substantially the same function as those in the first embodiment will be numbered the same here, and will be briefly described here. In addition, the description of the first embodiment is applied to description of the elements which is omitted in the second embodiment.

The bicycle seatpost assembly 210 of the second embodiment comprises the first tube 12, the second tube 14, and a positioning structure 216 (an example of a fluid flow control structure for a bicycle device) in the same manner as the first embodiment.

The first tube 12 has an opening 12a at one end.

The second tube 14 is telescopically received in the first tube 12 in the telescopic direction D1 via the opening 12a of the first tube 12. The second tube 14 has a distal end 14a and a proximal end 14b. A bicycle seat 6 is to be mounted to the distal end 14a. The proximal end 14b is opposite to the distal end 14a in the telescopic direction D1.

The second tube 14 is movable in the telescopic direction D1 between a first position SP1 in which the distal end 14a is closest to the opening 12a of the first tube 12 and a second position SP2 in which the distal end 14a is farthest to the opening 12a of the first tube 12.

(Positioning Structure)

Figure 8:
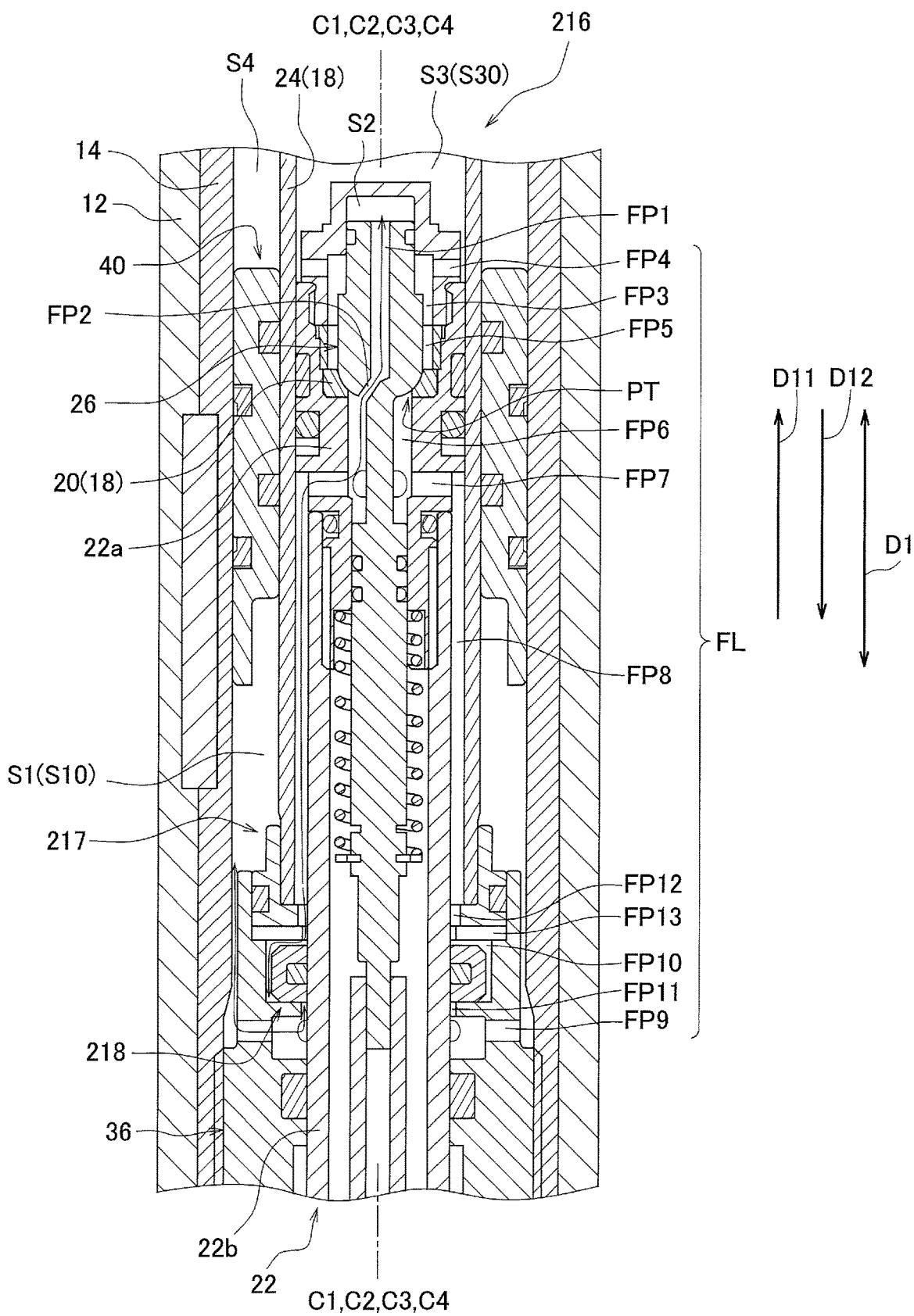
FIG. 8 is a partial cross-sectional view of the bicycle seatpost assembly illustrated in FIG. 7 (a closed state where a port is closed)

As shown in FIG. 8, the positioning structure 216 comprises the fluid chamber structure 18 and the piston 22a. The positioning structure 216 further comprises the sealing member 26.

The fluid chamber structure 18 includes the tube member 24 at least partly defining the first chamber S1, the third chamber S3 (an example of a second chamber in claims), and a fluid passage FL (an example of a fluid chamber in claims) for changing volumes of the first chamber S1 and the third chamber S3. The fluid chamber structure 18 further includes the port 20.

The tube member 24 has the fourth center axis C4 (an example of a longitudinal axis).

As shown in FIG. 8, the fluid passage FL includes the third to thirteenth fluid passages FP3-FP13 and the variable fluid passage PT. The fluid passage FL includes a minimum fluid passage FLM in the same manner as the first embodiment.

Specifically, the third to thirteenth fluid passages FP3-FP13 and the variable fluid passage PT includes the minimum fluid passage FLM. In the embodiment, the variable fluid passage PT includes the minimum fluid passage FLM (see FIG. 6C). In other words, the variable fluid passage PT defines the minimum fluid passage FLM.

As shown in FIG. 6C, the minimum fluid passage FLM is arranged between the port 20 and the sealing member 26, in a state where the sealing member 26 is farthest from the port 20 in the telescopic direction D1.

Specifically, the minimum fluid passage FLM is arranged between the inner peripheral surface of the port 20 and the outer peripheral surface of the sealing member 26 in the above state.

More specifically, the minimum fluid passage FLM is arranged between the first tapered surface 20b of the port 20 and the second tapered surface 26d of the plug portion 26b in the above state.

In the embodiment, the minimum fluid passage FLM is defined by the first circle line CL1 and the second circle line CL2. The first circle line CL1 and the second circle line CL2 are arranged opposed to each other on the minimum fluid passage FLM. The first circle line CL1 is arranged on the port 20, for example, the first tapered surface 20b of the port 20. The second circle line CL2 is arranged on the sealing member 26, for example, on the second tapered surface 26d of the plug portion 26b.

The minimum fluid passage FLM includes the minimum area A. The minimum area A is the smallest area in passing area of fluid flow which passes through the third to thirteenth fluid passages FP3-FP13 and the variable fluid passage PT. In the embodiment, the minimum area A corresponds to area between the first circle line CL1 and the second circle line CL2.

In addition, the minimum fluid passage FLM can be formed in any shape on condition that the minimum area A is the above smallest area. For example, in case that the fourth fluid passage FP4 or the seventh fluid passage FP7 includes the minimum fluid passage FLM, the minimum fluid passage FLM is defined by the plurality of first hole portions 28g or the plurality of second hole portions 22h. In this case, the minimum area A corresponds to total area of the plurality of first hole portions 28g or total area of the plurality of second hole portions 22h.

As shown in FIG. 8, the port 20 is formed on the piston 22a in the same manner as the first embodiment. The port 20 has a closed state and the open state. In the closed state, the port 20 fluidly separates the first chamber S1 and the third chamber S3. The closed state is a state where the sealing member 26 contacts the port 20. In the closed state, the first chamber S1 and the third chamber S3 are not fluidly communicating with each other. In the open state, the port 20 fluidly connects the first chamber S1 and the third chamber S3 via a reverse flow blocking structure 217 (as described below). The open state is a state where the sealing member 26 is far away from the port 20.

The piston 22a is movably disposed in the tube member 24 in the telescopic direction D1. The tube member 24 has the fourth center axis C4 (an example of a longitudinal axis).

The sealing member 26 is movable relative to the port 20 between an open position to define the open state of the port 20, and a close position to define the closed state of the port 20.

The sealing member 26 is movable relative to the piston 22a in the telescopic direction D1. The open position of the sealing member 26 is defined in a state where the sealing member 26 is farthest from the port 20 in the telescopic direction D1.

The positioning structure 216 further comprises the reverse flow blocking structure 217. The movable piston 40 is configured to be movable between the first chamber S1 and the fourth chamber S4 in the telescopic direction D1.

(Reverse Flow Blocking Structure)

The reverse flow blocking structure 217 is configured to block a fluid passage between the movable piston 40 and the sealing member 26 in the closed state. The reverse flow blocking structure 217 is configured to block a fluid passage between the movable piston 40 and the variable fluid passage PT in the closed state. The reverse flow blocking structure 217 is configured to open the fluid passage between the movable piston 40 and the sealing member 26 in the opened state. The reverse flow blocking structure 217 is configured to open the fluid passage between the movable piston 40 and the variable fluid passage PT in the opened state.

The reverse flow blocking structure 217 is configured to be movable with the second tube 14 in the telescopic direction D1 in the opened state. Specifically, the reverse flow blocking structure 217 is configured to be movable with the second tube 14 and the tube member 24 in the telescopic direction D1 in the opened state. Further, the reverse flow blocking structure 217 is configured to be movable with respect to the second tube 14 in the telescopic direction D1.

As shown in FIG. 8, the reverse flow blocking structure 217 is disposed in the first chamber S1. Specifically, the reverse flow blocking structure 217 is disposed between the sealing member 26 and the movable piston 40 along the fluid passage between the variable fluid passage PT and the movable piston 40.

For example, the reverse flow blocking structure 217 is disposed between the seventh fluid passage FP7 and the ninth fluid passage FP9. Specifically, the reverse flow blocking structure 217 is disposed between the eighth fluid passage FP8 and the ninth fluid passage FP9.

Figure 9:
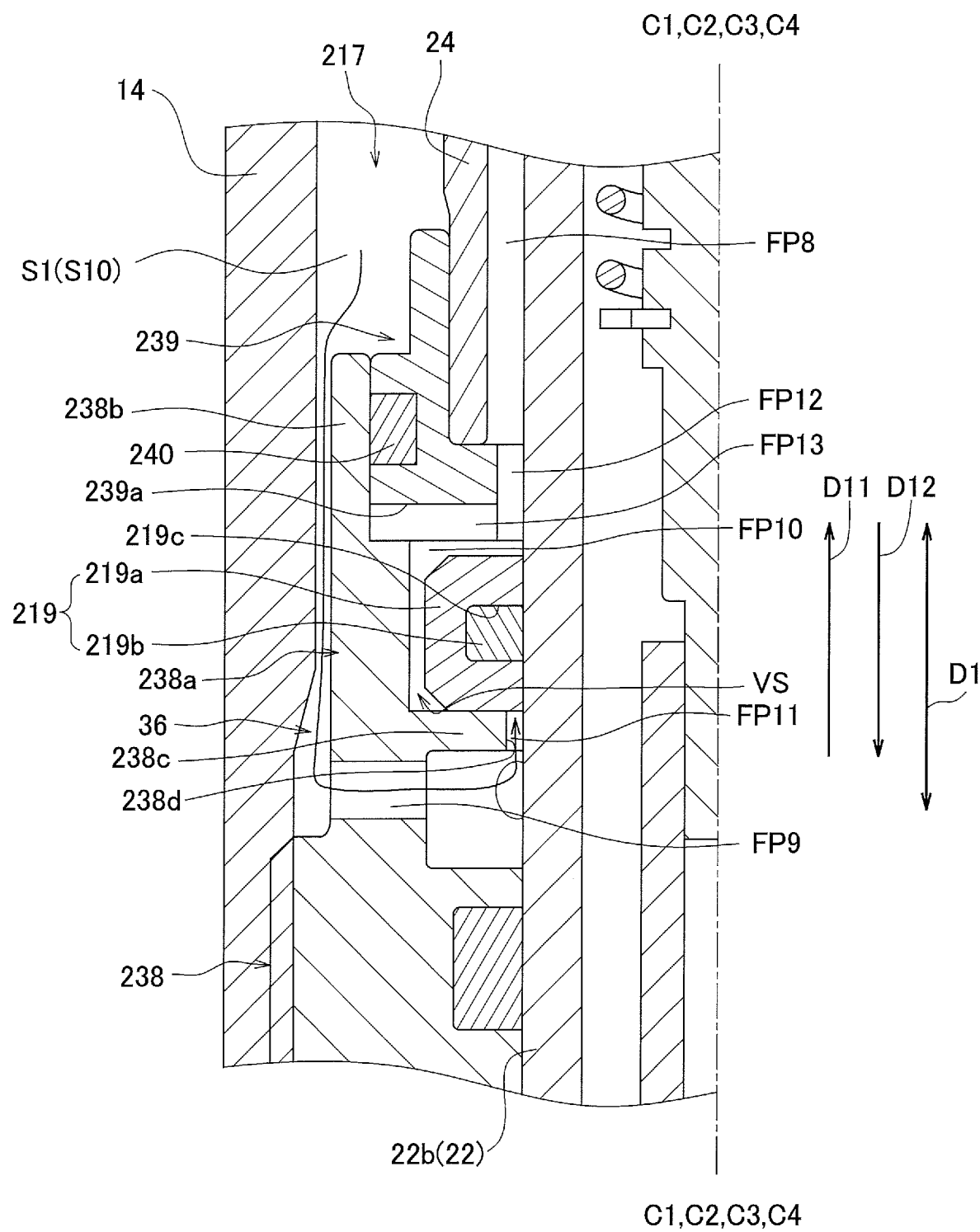
FIG. 9 is an enlarged cross-sectional view of FIG. 8 (the closed state)

As shown in FIG. 9, the reverse flow blocking structure 217 includes a valve portion 218. The valve portion 218 functions as a check valve in the closed state. The valve portion 218 includes a valve body 219 and the sealing plug 36.

The valve body 219 is an example of "a first block portion." A connecting member 239 (described below) and a third concave portion 238a (described below) are an example of "a second block portion."

The valve body 219 blocks the fluid passage in a state where the valve body 219 abuts to the sealing plug 36 in a second axial direction D12.

A first axial direction D11 and the second axial direction D12 are defined by at least one of the first center axis C1, the second center axis C2, the third center axis C3, and the fourth center axis C4. In this embodiment, the first axial direction D11 corresponds to an upward direction on the telescopic direction D1. The second axial direction D12 corresponds to a downward direction on the telescopic direction D1.

The valve body 219 is formed in a substantially annular shape. In other words, the valve body 219 is a substantially annular member. The valve body 219 is disposed around the support member 22b.

The valve body 219 is attached to the support member 22b which is secured to the first tube 12. The valve body 219 is slidably attached to the support member 22b. Specifically, the valve body 219 is slidably attached to the support member 22b such that sliding resistance generates between the valve body 219 and the support member 22b.

The valve body 219 is movable with respect to the sealing plug 36 in the telescopic direction D1 (the first and second axial directions D11, D12). Specifically, the valve body 219 is contained in the sealing plug 36. For example, the valve body 219 is disposed in a valve storage space VS (described below). The valve body 219 is movable with respect to the sealing plug 36 in the valve storage space VS in the telescopic direction D1.

As shown in FIG. 9, the valve body 219 includes a body member 219a and a seal body 219b.

The body member 219a is attached to the support member 22b via the seal body 219b such that the sliding resistance generates between the seal body 219b and the support member 22b.

The body member 219a is formed in a substantially annular shape. The body member 219a includes an annular concave portion 219c. The annular concave portion 219c faces the support member 22b.

The body member 219a is disposed in the valve storage space VS. The body member 219a is movable with respect to the sealing plug 36 and the support member 22b in the valve storage space VS (described below) in the telescopic direction D1.

The seal body 219b is disposed between the body member 219a and the support member 22b. Specifically, the seal body 219b is disposed in the annular concave portion 219c and contacts the support member 22b. The sliding resistance generates between the seal body 219b and the support member 22b because of frictional force between the seal body 219b and the support member 22b.

An outer diameter of the valve body 219 is smaller than an inner diameter of the valve storage space VS, for example, an inner diameter of the third concave portion 238a.

An axial length of the valve body 219 is smaller than an axial length of the valve storage space VS. Specifically, the axial length of the valve body 219 is smaller than the axial length between a lower end portion of a connecting member 239 (described below) and a bottom surface of the third concave portion 238a in the telescopic direction D1.

Thereby, as shown in FIG. 9, the tenth fluid passage FP10 communicates with a twelfth fluid passage FP12, in case that the valve body 219 abuts to the bottom surface of the third concave portion 238a.

The tenth fluid passage FP10 may communicate with the twelfth fluid passage FP12 via the thirteenth fluid passage FP13. In this case, the tenth fluid passage FP10 don't communicate with the eleventh fluid passage FP11, because the tenth fluid passage FP10 is blocked by the abutment of the valve body 219 to the bottom surface of the third concave portion 238a.

Figure 10A:
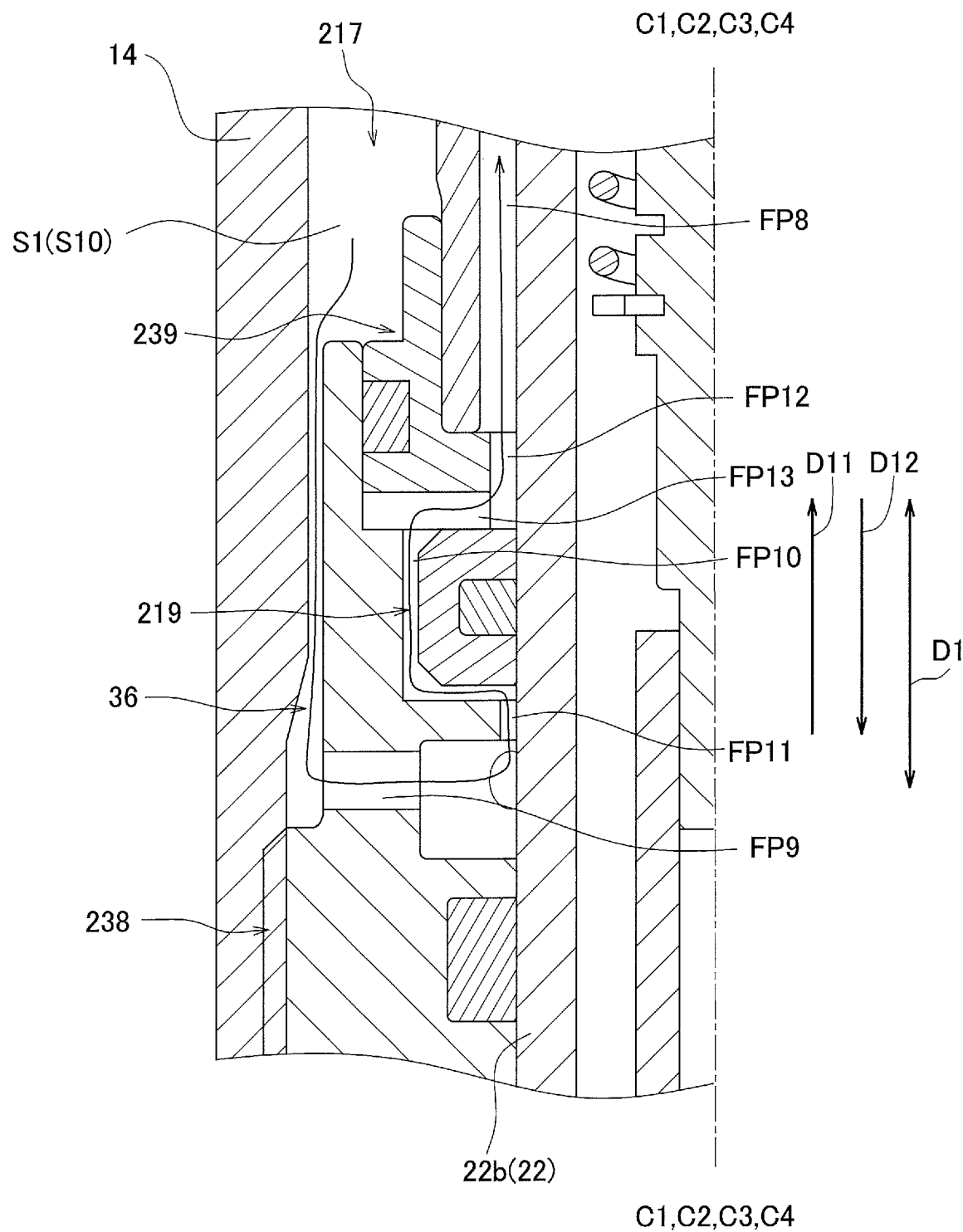
FIG. 10A is an enlarged cross-sectional view of FIG. 8 (an opened state where a port is opened)
Figure 10B:
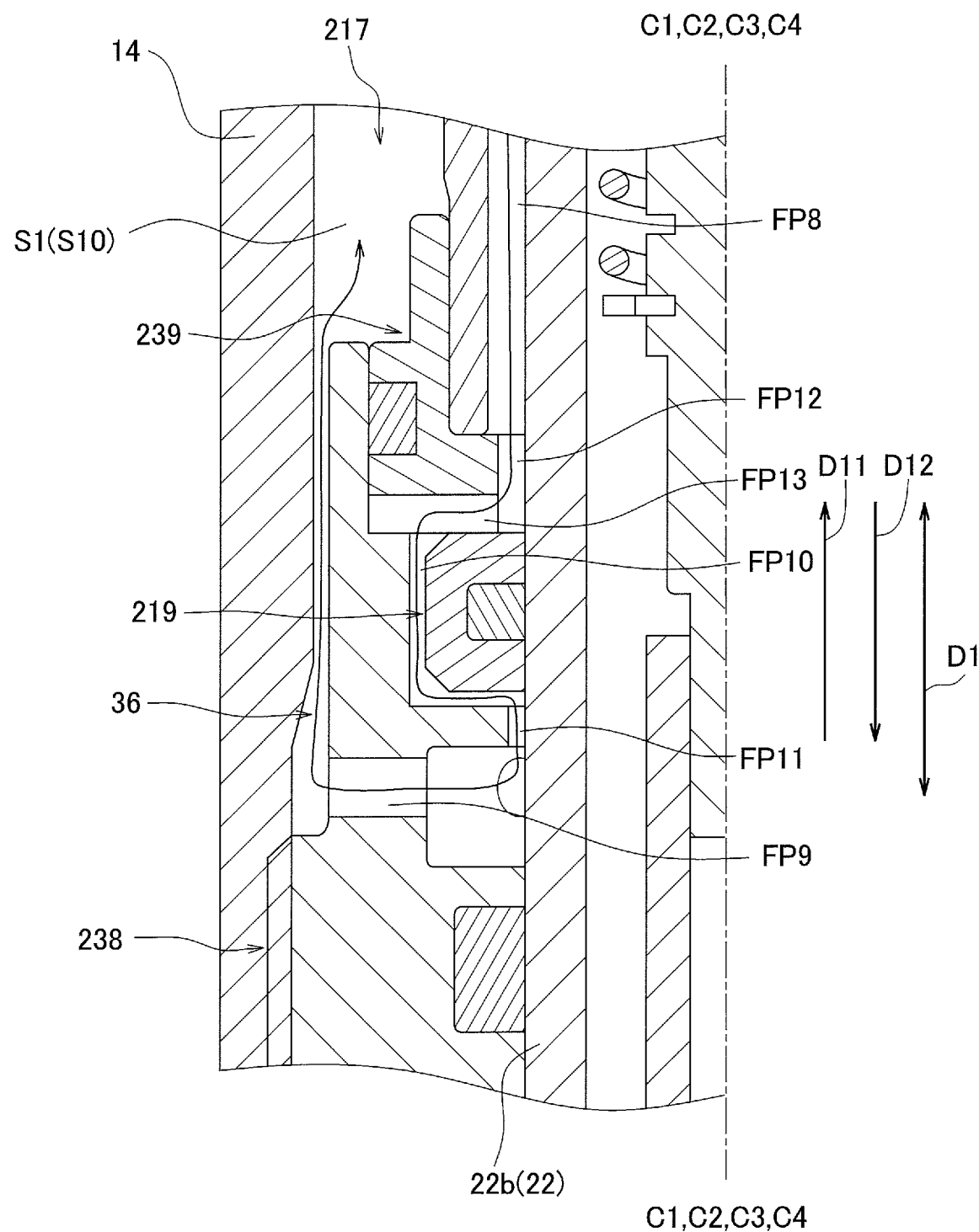
FIG. 10B is an enlarged cross-sectional view of FIG. 8 (the opened state).

Also, as shown in FIGS. 10A and 10B, a tenth fluid passage FP10 is formed between the valve body 219 and the third concave portion 238a, in case that the valve body 219 abuts to the lower end portion of the connecting member 239. For example, the tenth fluid passage FP10 communicates with a thirteenth fluid passage FP13 (described below) and a eleventh fluid passage FP11 (described below), in case that the valve body 219 abuts to the lower end portion of the connecting member 239.

As shown in FIG. 9, the sealing plug 36 is attached to the second tube 14. The sealing plug 36 includes a main body 238 and the connecting member 239. Also, the sealing plug 36 includes a valve storage space VS. The valve storage space VS is formed by the main body 238 and the connecting member 239.

The main body 238 is attached to the second tube 14 in the same way as the first embodiment. The main body 238 is mounted to the tube member 24 via the connecting member 239. The main body 238 includes the third concave portion 238a and a fourth concave portion 238b.

The third concave portion 238a is concaved in telescopic direction D1 (e.g. the second axial direction D12). The third concave portion 238a is formed in a substantially bottomed cylindrical shape.

The third concave portion 238a includes an annular flange portion 238c. The annular flange portion 238c is formed in a substantially annular shape. The eleventh fluid passage FP11 is formed between an inner peripheral surface of the annular flange portion 238c and the support member 22b.

The valve body 219 is disposed in the third concave portion 238a. The valve portion 218 (the valve body 219) is configured to abut to the bottom surface of the third concave portion 238a. A fourth hole portion 238d is formed in a bottom portion of the third concave portion 238a. The eleventh fluid passage FP11 is formed between the support member 22b and the fourth hole portion 238d.

The fourth concave portion 238b is formed in a substantially bottomed cylindrical shape. An inner diameter of the fourth concave portion 238b is larger than an inner diameter of the third concave portion 238a. The third concave portion 238a is formed on a bottom portion of the fourth concave portion 238b. The connecting member 239 is disposed in the fourth concave portion 238b.

As shown in FIG. 9, the connecting member 239 is configured to connect the main body 238 to the tube member 24. The connecting member 239 is formed in a substantially annular shape.

The connecting member 239 is attached to the main body 238. Also, the connecting member 239 is mounted to the tube member 24. Specifically, the connecting member 239 is attached to the fourth concave portion 238b of the main body 238 via a sealing member 240.

The lower end portion of the connecting member 239 partially abuts to a bottom surface of the fourth concave portion 238b in the telescopic direction D1 (e.g. the second axial direction D12).

A part of a lower end surface of the connecting member 239 abuts to a bottom surface of the fourth concave portion 238b in the second axial direction D12. The other part of the lower end surface of the connecting member 239 is arranged at intervals with the valve portion 218 in the second axial direction D12. The other part of the lower end surface is configured to abut to the valve portion 218 (the valve body 219).

In this state, the twelfth fluid passage FP12 is formed between the connecting member 239 and the support member 22b. Specifically, the twelfth fluid passage FP12 is formed between an inner surface of the connecting member 239 and the outer surface of the support member 22b. The twelfth fluid passage FP12 communicate with the eighth fluid passage FP8 and the thirteenth fluid passages FP13.

The connecting member 239 is disposed in the fourth concave portion 238b of the main body 238. The connecting member 239 forms the valve storage space VS with the main body 238. Specifically, the connecting member 239 forms the valve storage space VS with the third concave portion 238a of the main body 238.

The valve storage space VS is formed between the connecting member 239 and the third concave portion 238a. Specifically, the valve storage space VS is formed between the lower end surface of the connecting member 239 and the inner peripheral surface of the third concave portion 238a. The valve storage space VS forms a substantially annular concave space.

The valve storage space VS communicates with the thirteenth fluid passages FP13. The valve storage space VS communicates with the eleventh fluid passage FP11. The eleventh fluid passage FP11 communicates with the ninth fluid passage FP9.

The connecting member 239 includes at least one groove portion 239a (an example of "gap"). The at least one groove portion 239a extends on radially outside from an inner peripheral portion of the connecting member 239.

The at least one groove portion 239a is provided for passing the incompressible fluid between the valve body 219 and the sealing plug 36, in a state where the valve body 219 abuts to the sealing plug 36 in the first axial direction D11.

In this embodiment, for example, each of a plurality of groove portions 239a is formed on the end portion of the connecting member 239 in the telescopic direction D1. Each of the plurality of groove portions 239a is arranged at intervals in the circumferential direction. Each of the plurality of groove portions 239a extends on radially outside from the twelfth fluid passage FP12.

A bottom portion of each of the groove portions 239a faces the bottom portion of the third concave portion 238a. Specifically, a bottom surface of each of the groove portions 239a is disposed at intervals from the bottom surface of the third concave portion 238a.

Each of the groove portions 239a is used as the thirteenth fluid passage FP13. The thirteenth fluid passages FP13 communicate with the twelfth fluid passage FP12 and the valve storage space VS. As shown in FIGS. 10A and 10B, the thirteenth fluid passages FP13 are formed between the groove portion 239a and the valve body 219 in a state where the valve body 219 abuts to the lower end surface of the connecting member 239.

<Aperture Rate of the Positioning Structure and Characteristic of the Fluid>

The aperture rate AT is set in the same manner as the first embodiment. The aperture rate AT is defined by dividing an area A of the minimum fluid passage FLM by a flow rate Q. The aperture rate AT is calculated with a formula: $AT=A/Q$. The aperture rate AT is equal to or greater than 0.1. The aperture rate AT is equal to or smaller than 0.6. Preferably, the aperture rate AT is equal to or smaller than 0.35. More preferably, the aperture rate AT is equal to or smaller than 0.15. In the embodiment, the aperture rate AT is set to 0.13.

The minimum area A is defined by the open state of the port 20. The minimum area A (the area A of the minimum fluid passage FLM) is equal to or greater than 13 mm$^2$.

Preferably, the minimum area A is equal to or greater than 15 mm². In the embodiment, the minimum area A is set to 15 mm².

The flow rate Q is defined by fluid volume VL (mm³) passing through the minimum fluid passage FLM as the tube member 24 moves relative to the piston 22a at 1.0 mm. The flow rate Q is defined based on the outer diameter FR1 of the piston 22a. For example, the flow rate Q is calculated by multiplying pi ($\pi$), the radius (FR1/2) of the large-diameter portion of the piston 22a squared, and 1.0 mm. In other words, the flow rate Q is calculated with a formula: $Q=\pi*(FR1^2/4)$.

For example, the outer diameter FR1 of the piston 22a is equal to or greater than 8.0 mm. Preferably, the outer diameter FR1 of the piston 22a is equal to or smaller than 30 mm. In the embodiment, the outer diameter FR1 of the piston 22a is set to 12 mm.

The kinematic viscosity of fluid in the fluid passage FL is equal to or smaller than 50 mm²/sec at 40 degrees Celsius. Preferably, the kinematic viscosity is equal to or smaller than 10 mm²/sec at 40 degrees Celsius.

Specifically, the kinematic viscosity of fluid in the third to thirteenth fluid passages FP3-FP13 and the variable fluid passage PT is set to the above ranges at 40 degrees Celsius. More specifically, the kinematic viscosity of fluid in the first to thirteenth fluid passages FP1-FP13 and the variable fluid passage PT is set to the above ranges at 40 degrees Celsius. In the embodiment, the kinematic viscosity of fluid is set to 8.0 mm²/sec at 40 degrees Celsius.

The Reynolds number RE of fluid in the fluid passage FL is set in the same manner as the first embodiment as follows. The Reynolds number RE is defined by the kinematic viscosity v, velocity V of fluid, and an outer diameter FR1 of the piston 22a. For example, the Reynolds number RE is calculated by multiplying the velocity V of fluid, the outer diameter FR1 of the piston 22a, and an inverse number of the kinematic viscosity v. The velocity V of fluid is defined by the averaged velocity of fluid in the fluid passage FL. In other word, the Reynolds number RE is calculated with a formula: $RE=V*FR1/v$.

The Reynolds number RE of fluid in the fluid passage FL is equal to or greater than 100. Preferably, the Reynolds number RE is equal to or greater than 150. In the embodiment, the Reynolds number RE is set to 875, in case that the kinematic viscosity of fluid is set to 8.0 mm²/sec at 40 degrees Celsius. In addition, the Reynolds number RE can be set in a range between 160 and 200, in case that the kinematic viscosity of fluid is set to 50 mm²/sec at 40 degrees Celsius.

Specifically, the Reynolds number RE of fluid in the third to thirteenth fluid passages FP3-FP13 and the variable fluid passage PT is set to the above ranges at 40 degrees Celsius. In the embodiment, the Reynolds number RE of fluid in the first to thirteenth fluid passages FP1-FP13 and the variable fluid passage PT is set to the above ranges at 40 degrees Celsius.

<Operation of Positioning Structure>

(Opened State)

In the opened state, the bicycle seat 6 moves upward with respect to the first tube 12 and the support portion 22, for example, the support member 22b, by the positioning structure 216.

The incompressible fluid moves from the main chamber S10 of the first chamber S1 to the third chamber S3 via the variable fluid passage PT in the same way as the first embodiment (see FIGS. 8 and 10A).

Specifically, the incompressible fluid moves from the main chamber S10 of the first chamber S1 to the third chamber S3. Then, as shown in FIGS. 8 and 10A, the incompressible fluid passes through the fluid passages in order of the ninth fluid passage FP9, the eleventh fluid passage FP11, the tenth fluid passage FP10, the thirteenth fluid passage FP13, the twelfth fluid passage FP12, the eighth fluid passage FP8, the seventh fluid passage FP7, the sixth fluid passage FP6, and the variable fluid passage PT.

More specifically, the incompressible fluid moves from the main chamber S10 of the first chamber S1 to the main chamber S30 of the third chamber S3 via the above fluid passage FP6-FP13 and PT when the movable piston 40 moves downward by expansion of the compressible fluid in the fourth chamber S4.

The valve body 219 is pressed upward by flow of the incompressible fluid and abuts to the end surface of the connecting member 239. In other words, the reverse flow blocking structure 217 is opened, and the incompressible fluid can pass through the eleventh fluid passage FP11 and the tenth fluid passage FP10.

In case that the bicycle seat 6 is pushed down in the opened state, the valve body 219 moves upward with respect to the sealing plug 36 by the sliding resistance between the valve body 219 and the support member 22b.

In this case, the incompressible fluid moves from the third chamber S3 to the main chamber S10 of the first chamber S1 via the variable fluid passage PT in the same way as the first embodiment (see FIGS. 8 and 10B).

Specifically, the incompressible fluid moves from the third chamber S3 to the main chamber S10 of the first chamber S1. Then, as shown in FIGS. 8 and 10B, the incompressible fluid passes through the fluid passages in order of the variable fluid passage PT, the sixth fluid passage FP6, the seventh fluid passage FP7, the eighth fluid passage FP8, the twelfth fluid passage FP12, the thirteenth fluid passage FP13, the tenth fluid passage FP10, the eleventh fluid passage FP11, and the ninth fluid passage FP9.

The third chamber S3 is shrunk by an outflow of the incompressible fluid from therein, and the main chamber S10 of the first chamber S1 is expanded by an inflow of the incompressible fluid to therein. Then, the movable piston 40 moves upward by expansion of the main chamber S10 of the first chamber S1, and the compressible fluid in the fourth chamber S4 is shrunk by the movement of the movable piston 40.

The valve body 219 is held on the support member 22b by the sliding resistance between the valve body 219 and the support member 22b. In other words, the reverse flow blocking structure 217 is opened, and the incompressible fluid can pass through the eleventh fluid passage FP11 and the tenth fluid passage FP10.

(Closed State)

In case that the bicycle seat 6 is pulled up in the closed state, the valve body 219 moves downward with respect to the sealing plug 36 by the sliding resistance between the valve body 219 and the support member 22b.

Specifically, pressure in space between the variable fluid passage PT and the valve body 219 increases. Specifically, the pressure in the space of the fluid passages FP6, FP7, FP8, FP12, FP13 and the second chamber S2 increases. Then, as shown in FIG. 9, the valve body 219 is pressed downward by the incompressible fluid of the space and abuts to the bottom surface of the third concave portion 238a.

In other words, the tenth fluid passage FP10 is partially shut by an abutment of the valve body 219 and the bottom surface of the third concave portion 238a. Specifically, the valve body 219 prevents the incompressible fluid from flowing from the main chamber S10 of the first chamber S1 toward the tenth fluid passages FP10 via the ninth fluid passages FP9 and the eleventh fluid passages FP11.

Thereby, the incompressible fluid in the first chamber S1 is substantially stable by the reverse flow blocking structure 217, even if the bicycle seat 6 is manually pulled up in the closed state. Herewith, the above issue is solved by the reverse flow blocking structure 217.

<Relationship Between Pressing Force and Movement Velocity of the Tube Member>

The bicycle seatpost assembly 210 includes the following relationship between pressing force of the second tube 14 and movement velocity of the tube member 24 in the same manner as the first embodiment.

The bicycle seatpost assembly 210 is configured so that pressing force, which presses the second tube 14 from the first position SP1 toward the second position SP2 in the telescopic direction D1, is equal to or smaller than 75 N at the first position SP1 in the following case. In this case, an average movement velocity of the tube member 24 is set to 500 mm/sec as the second tube 14 moves from the first position SP1 to the second position SP2 relative to the first tube 12 in the telescopic direction D1.

Preferably, the bicycle seatpost assembly 210 is configured so that pressing force, which presses the second tube 14 from the first position SP1 toward the second position SP2 in the telescopic direction D1, is equal to or smaller than 100 N at the first position SP1 in the following case. In this case, an average movement velocity of the tube member 24 is set to 600 mm/sec as the second tube 14 moves from the first position SP1 to the second position SP2 relative to the first tube 12 in the telescopic direction D1.

Also, the bicycle seatpost assembly 210 is configured so that an average movement velocity of the tube member 24 is equal to or greater than 600 mm/sec as the second tube 14 moves from the first position SP1 to the second position SP2 relative to the first tube 12 in the telescopic direction D1 in the following case. In this case, pressing force, which presses the second tube 14 from the first position SP1 toward the second position SP2 in the telescopic direction D1, is set to 100 N at the first position SP1.

A Variation of the Second Embodiment

As a variation of the second embodiment, the positioning structure 216 can be interpreted as follows.

(A1) In the second embodiment, explanation is performed as an example that the sealing plug 36 includes the third concave portion 238a.

The third concave portion 238a may be provided separately from the sealing plug 36. In this case, the third concave portion 238a may be formed integrally with connecting member 239. Also, the third concave portion 238a may be formed separately from the connecting member 239. The third concave portion 238a may be attached to the sealing plug 36 and/or the tube member 24.

(A2) In the second embodiment, explanation is performed as an example that the connecting member 239 includes at least one groove portion 239a.

The valve body 219 (the body member 219a) may include at least one groove portion 239a. In this case, only the valve body 219 (the body member 219a), or both of the valve body 219 (the body member 219a) and the connecting member 239 may include the groove portion 239a.

The Other Embodiment

As a variation of the first and second embodiments, the positioning structure 16, 216 can be configured as follows.

(B1) In the first and second embodiments, explanation is performed as an example that the positioning structure 16, 216 includes the dividing member 28. Instead of this configuration, the positioning structure 16, 216 can be configured without the dividing member 28. In this case, the fluid chamber structure 18 includes the first chamber S1 and the second chamber S2. The third chamber S3 isn't provided in the fluid chamber structure 18. The second hollow portion 26e and the first and second fluid passages FP1, FP2 aren't formed on the plug portion 26b.

(B2) In the first and second embodiments, explanation is performed as an example that the fluid passages FP3, FP4, PT is provided between the sealing member 26 and the piston 22a. Instead of this configuration, the fluid passages FP3, FP4, PT is provided between the piston 22a and the tube member 24.

In this case, at least one hole portion is formed on an outer peripheral portion of the piston 22a. The at least one hole portion defines a port of the present invention. The piston 22a is arranged radially inward of the tube member 24 and is partially disposed at interval from the tube member 24 in the radial direction. The sealing member such as O-ring is disposed between the piston 22a and the plug portion 26b in the radial direction. The fluid passages FP3, FP4, PT are defined by the at least one hole portion and the interval.

The sealing member is provided on the plug portion 26b and moves with the plug portion 26b. The at least one hole portion as the port is configured to change a state between the open state and the closed state by the sealing member, as the plug portion 26b moves with respect to the piston 22a.

In this case, the positioning structure 16 is configured such that the closed state and the open state are changed according to positional relationship between the piston 22a (the at least one hole portion) and the sealing member (the O-ring).

In addition, the sealing member can be included in the plug portion 26b. In this case, the positioning structure 16 is configured such that the closed state and the open state are changed according to positional relationship between the piston 22a (the at least one hole portion) and the plug portion 26b.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the fluid flow control structure for a bicycle device. Accordingly, these terms, as utilized to describe the present technology should be interpreted relative to the fluid flow control structure for a bicycle device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

The invention claimed is:

1. A fluid flow control structure for a bicycle device, the fluid flow control structure comprising:
    a fluid chamber structure including a tube member at least partly defining a first chamber, a second chamber, and a fluid passage for changing volumes of the first chamber and the second chamber, the tube member having a longitudinal axis, the fluid passage including a plurality of constituent fluid passages; and
    a piston movably disposed in the tube member in an axial direction of the longitudinal axis; wherein
    an aperture rate is defined by dividing a minimum area of the fluid passage by a flow rate per unit distance, the flow rate per unit distance being defined by a fluid volume passing through the minimum area as the tube member moves relative to the piston at 1.0 mm, the minimum area being defined as a smallest flow area among the plurality of constituent fluid passages of the fluid passage, and
    the aperture rate is equal to or greater than 0.1.

2. The fluid flow control structure according to claim 1, wherein
    the aperture rate is equal to or smaller than 0.6.

3. The fluid flow control structure according to claim 2, wherein
    the aperture rate is equal to or smaller than 0.35.

4. The fluid flow control structure according to claim 3, wherein
    the aperture rate is equal to or smaller than 0.15.

5. The fluid flow control structure according to claim 1, wherein
    kinematic viscosity of fluid in the fluid passage is equal to or smaller than 50 mm$^2$/sec at 40 degrees Celsius.

6. The fluid flow control structure according to claim 5, wherein
    the kinematic viscosity is equal to or smaller than 10 mm$^2$/sec at 40 degrees Celsius.

7. The fluid flow control structure according to claim 1, wherein
    the Reynolds number of fluid in the fluid passage is equal to or greater than 100.

8. The fluid flow control structure according to claim 7, wherein
    the Reynolds number is equal to or greater than 150.

9. The fluid flow control structure according to claim 1, wherein
    the flow rate per unit distance is defined based on an outer diameter of the piston.

10. The fluid flow control structure according to claim 9, wherein
    the outer diameter is equal to or greater than 8.0 mm.

11. The fluid flow control structure according to claim 10, wherein
    the outer diameter is equal to or smaller than 30 mm.

12. The fluid flow control structure according to claim 1, wherein
    the minimum area of the fluid passage is equal to or greater than 13 mm$^2$.

13. The fluid flow control structure according to claim 12, wherein
    the minimum area of the fluid passage is equal to or greater than 15 mm$^2$.

14. The fluid flow control structure according to claim 1, wherein
    the fluid chamber structure includes a port having a closed state in which the port fluidly separates the first chamber and the second chamber, and an open state in which the port fluidly connects the first chamber and the second chamber, and
    the minimum area of the fluid passage is defined by the open state of the port.

15. The fluid flow control structure according to claim 14, further comprising
    a sealing member movable relative to the port between an open position to define the open state of the port, and a close position to define the closed state of the port.

16. The fluid flow control structure according to claim 15, wherein
    the port is formed on the piston,
    the sealing member is movable relative to the piston in the axial direction, and
    the open position of the sealing member is defined in a state where the sealing member is farthest from the port in the axial direction.

17. A bicycle seatpost assembly comprising
    the fluid flow control structure according to claim 1;
    a first tube having an opening at one end; and
    a second tube telescopically received in the first tube in the axial direction via the opening of the first tube, the second tube having a distal end to which a bicycle seat is to be mounted and a proximal end opposite to the distal end in the axial direction, the second tube being movable in the axial direction between a first position in which the distal end is closest to the opening of the first tube and a second position in which the distal end is farthest to the opening of the first tube.

18. The bicycle seatpost assembly according to claim 17, wherein
    in case that an average movement velocity of the tube member is set to 500 mm/sec as the second tube moves from the first position to the second position relative to the first tube in the axial direction, pressing force, which presses the second tube from the first position toward the second position in the axial direction, is equal to or smaller than 75 N at the first position.

19. The bicycle seatpost assembly according to claim 17, wherein in case that an average movement velocity of the tube member is set to 600 mm/sec as the second tube moves from the first position to the second position relative to the first tube in the axial direction, pressing force, which presses the second tube from the first position toward the second position in the axial direction, is equal to or smaller than 100 N at the first position.

20. The bicycle seatpost assembly according to claim 17, wherein in case that pressing force, which presses the second tube from the first position toward the second position in the axial direction, is set to 100 N at the first position, an average movement velocity of the tube member is equal to or greater than 600 mm/sec as the second tube moves from the first position to the second position relative to the first tube in the axial direction.

* * * * *